(12) United States Patent
Drumheller

(10) Patent No.: US 10,654,228 B2
(45) Date of Patent: May 19, 2020

(54) SYSTEM AND METHOD FOR FORMING A PART BY AUTOMATED FIBER PLACEMENT

(71) Applicant: THE BOEING COMPANY, Chicago, IL (US)

(72) Inventor: Michael Drumheller, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 72 days.

(21) Appl. No.: 15/663,232

(22) Filed: Jul. 28, 2017

(65) Prior Publication Data

US 2019/0030835 A1 Jan. 31, 2019

(51) Int. Cl.
*B29C 70/38* (2006.01)
*B29C 65/00* (2006.01)
*B29C 70/54* (2006.01)

(52) U.S. Cl.
CPC ........ *B29C 70/384* (2013.01); *B29C 66/8362* (2013.01); *B29C 70/382* (2013.01); *B29C 70/386* (2013.01); *B29C 70/545* (2013.01); *B29C 2793/0027* (2013.01); *B29C 2793/0063* (2013.01)

(58) Field of Classification Search
CPC .................................................. B29C 70/386
USPC ....................................................... 156/242
See application file for complete search history.

(56) References Cited

U.S. PATENT DOCUMENTS

| | | | |
|---|---|---|---|
| 9,545,759 B2 | 1/2017 | Yarker et al. | |
| 2007/0187024 A1* | 8/2007 | Johnson | B29C 70/32 |
| | | | 156/250 |
| 2009/0148647 A1* | 6/2009 | Jones | B29C 70/30 |
| | | | 428/58 |
| 2009/0321985 A1 | 12/2009 | De Julian Aguado et al. | |
| 2014/0177936 A1* | 6/2014 | Toledano | B29C 70/38 |
| | | | 382/141 |
| 2014/0330420 A1 | 11/2014 | Maclean | |
| 2016/0221271 A1* | 8/2016 | Yarker | B29C 70/02 |

FOREIGN PATENT DOCUMENTS

| | | |
|---|---|---|
| EP | 2749869 A1 | 7/2014 |
| EP | 3078471 A1 | 10/2016 |

OTHER PUBLICATIONS

Cgtech, "Programming & Simulation Software for Automated Fiber Placement (AFP) & Tape Laying (ATL)", Vericut Composite Applications Brochure, accessed Apr. 4, 2017, 3 pages. <http://www.cgtech.com/wp-content/uploads/resources/brochures/VERICUT_Composite_Brochure.pdf>.

Hasenjaeger, "Programming and Simulating Automated Fiber Placement (AFP) CNC Machines", SAMPE Journal, Nov./Dec. 2013, vol. 49, No. 6, 8 pages.

European Search Report for Application No. 18182259.4 dated Dec. 17, 2018, 6 pgs.

\* cited by examiner

*Primary Examiner* — Matthew J Daniels
*Assistant Examiner* — Hana C Page
(74) *Attorney, Agent, or Firm* — Moore IP Law

(57) ABSTRACT

A method of forming a part includes applying first fiber tows according to a pattern to form a first ply of a set of plies. The method further includes applying second fiber tows according to the pattern to form a second ply of the set of plies that overlies the first ply. The pattern of the second ply is shifted relative to the pattern of the first ply by an offset distance based on a period of the first fiber tows and a number of plies having the pattern in the set of plies.

20 Claims, 13 Drawing Sheets

SYSTEM AND METHOD FOR FORMING A PART BY AUTOMATED FIBER PLACEMENT

FIELD OF THE DISCLOSURE

The present disclosure is generally related to forming parts of composite material by automated fiber placement.

BACKGROUND

Automated fiber placement devices form composite parts by applying a plurality of narrow strips of material (e.g., carbon fiber impregnated with resin) referred to as tows. An automated fiber placement machine may apply tows by depositing the tows with a roller or other device. The automated fiber placement device applies or places multiple adjacent tows to form a contiguous array or band, referred to as a course. Multiple courses are applied to form a single layer of tows, referred to as a ply. A composite part includes multiple plies (a set of plies), and plies of the set of plies are often oriented in different directions (e.g., a 0 degree ply, a +45 degree ply, a 90 degree ply, and a −45 degree ply). An orientation of the ply refers to a nominal direction of the tows (and the composite fibers thereof) of the ply.

During tow application, automated fiber placement devices can start or stop individual tows within a course at designated locations. To stop a tow, the automated fiber placement device cuts the tow transversely and dispenses no further tow material. This is commonly referred to as "dropping" the tow. A corresponding blunt tow-end formed during dropping the tow is called a "tow drop." "Tow drop" may also refer to a blunt tow-end formed when starting deposition of a tow. Automated fiber placement devices can generally start or stop individual tows of a course at different locations to increase or decrease the width of a particular course as the particular course is applied or to make the tows conform to a specified ply outline. Each tow of the course has a fixed width; thus, when forming a curved part or a part having taper, some overlaps (locations where one tow overlies another tow) and gaps (voids in between two tows) may be formed in the plies. The region of a ply where courses come together obliquely and where tow drops are performed in order to prevent a surfeit or paucity of material and where gaps and overlaps are formed as a result of the blunt-ended geometry of tow drops, described below, is called a convergence zone. The gaps and overlaps of each ply create thickness variations (deviations from a nominal thickness) in the composite part. The thickness variations which manifest as depressions (from gaps) and bumps (from overlaps) in the surface of the composite part may be mitigated to achieve a desired tolerance, performance, or aesthetic, by post processing steps such as shimming, filling, grinding, polishing, machining, etc. These post processing steps may add weight to a part or cost and time to its production. Additionally, mitigating the thickness deviations may degrade strength and wear characteristics of the composite part.

Conventional methods of applying tows either result in relatively small magnitude (e.g., about 1 ply thickness) thickness deviations from the nominal thickness being spread over a relatively large region (e.g., multiple tow widths wide) of the part or result in relatively large magnitude (e.g., greater than 1 ply thickness) deviations from the nominal thickness being confined to a relatively small region (e.g., about 1 tow width wide) of the part. With each of the conventional methods, adding plies (forming thicker parts) increases an area of the region containing thickness variations or a magnitude of the thickness variations contained therein.

SUMMARY

In a particular implementation, a method of forming a part includes applying first fiber tows according to a pattern to form a first ply of a set of plies. The method further includes applying second fiber tows according to the pattern to form a second ply of the set of plies that overlies the first ply. The pattern of the second ply is shifted relative to the pattern of the first ply by an offset distance based on a period of the first fiber tows and a number of plies having the pattern in the set of plies.

In another particular implementation, a non-transitory processor-readable medium stores processor-executable instructions that, when executed by a processor, cause the processor to initiate application of first fiber tows according to a pattern to form a first ply of a set of plies. The instructions further cause the processor to initiate application of second fiber tows according to the pattern to form a second ply of the set of plies that overlies the first ply. The pattern of the second ply is shifted relative to the pattern of the first ply by an offset distance based on a period of the first fiber tows and a number of plies having the pattern in the set of plies.

In another particular implementation, a composite laminate includes a first ply of a set of plies. The first ply includes first fiber tows arranged according to a pattern. The composite laminate further includes a second ply of the set of plies overlying the first ply. The second ply includes second fiber tows arranged according to the pattern. The pattern of the second ply is offset relative to the pattern of the first ply by an offset distance based on a period of the first fiber tows and a number of plies having the pattern in the set of plies.

DETAILED DESCRIPTION

Figure 1:
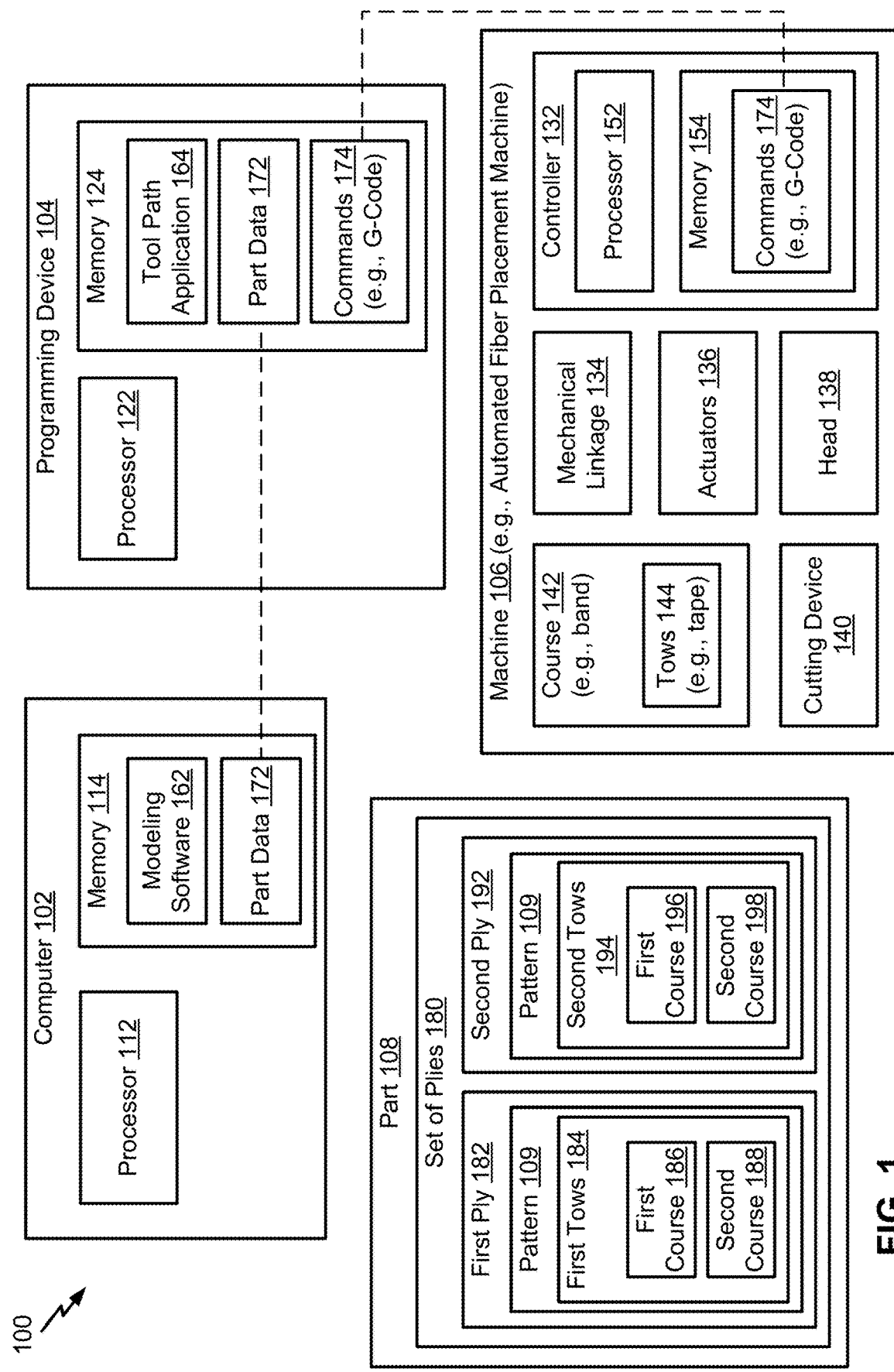
FIG. 1 illustrates a block diagram that depicts an example of a system for forming a part.

Implementations disclosed herein are directed to systems and methods for forming a part of composite material ("the part") by automated fiber placement. The systems and methods include generating machine readable instructions (e.g., G-code) for an automated fiber placement machine and forming the part by the automated fiber placement machine. The systems and methods disclosed herein simultaneously reduce the extent of a thickness deviation-containing region (e.g., a convergence zone) of the part and a thickness deviation severity (a magnitude or thickness of positive deviations, due to overlaps, and negative deviations, due to gaps). For example, positive thickness deviations in one ply are positioned to coincide with (i.e., be partially aligned with) negative thickness deviations in another ply such that the positive deviations and the negative thickness deviations partially coincide, i.e., positives are aligned with negatives and vice versa, so that they neutralize or cancel one another. This effect is referred to herein as "destructive interference." This is by analogy with trough-to-crest interference in physical waves, e.g., sound waves or water waves. In contrast, when positives align with positives and negatives with negatives, their influences compound, causing thickness deviations of more than 1 ply thickness, and thus bumps higher than 1 ply thickness and depressions deeper than 1 ply thickness on the part surface. This is referred to by the same analogy as "constructive interference." Noteworthy is that in this context, destructive interference is desirable.

These overlaps and gaps referenced herein are referred to as "planned" overlaps and gaps. These overlaps and gaps are programmed intentionally into tool paths and machine readable instructions according to method of this disclosure to prevent or mitigate thickness deviations that would otherwise appear on parts containing convergence zones such as curved or tapered parts. These overlaps and gaps are distinct from unintended overlaps or gaps that may occur due to equipment or material tolerances or process variations. For example, variations in thickness or width of the tows may cause unintended overlaps or gaps. Additionally, tow placement variations by the automated fiber machine may cause unintended overlaps or gaps.

The destructive interference (and avoidance/reduction of constructive interference) limits deviations in the part to plus or minus 1 ply thickness and to an approximately 1 tow width wide region of the part. As used herein, ply thickness is a spatial extent of a tow or fiber material perpendicular to the part surface, which dimension is called a thickness dimension. Ply thickness is distinct from the tow width, which is the spatial extent of a tow parallel to the part surface and perpendicular to the individual fibers, which dimension is called a lateral dimension. The dimension along the individual fibers is called a longitudinal dimension. The destructive interference limits a magnitude of deviations in the thickness dimension to 1 ply thickness from the intended thickness and limits a region of the part where such deviations occur to the lateral dimension of one tow width. As a result, less or no post processing (e.g., shimming, filling, polishing, machining, etc.) is employed to finalize the part for use. Accordingly, time and costs associated with production of the part are reduced and the part may have reduced weight due to reduced filler materials. Additionally, the reduced post processing of the part may enhance strength and wear characteristics of the part as compared to parts formed by alternative methods.

Alternative methods either vary the positions of the deviations (due to gaps and overlaps) from ply to ply such that the deviations are not compounded (do not form constructive interference) when additional plies are added, referred to as a non-interference method, or align (partially) the position of the deviations to compound (form constructive interference) and confine the region of deviations to a relatively small area, referred to as an uncontrolled-interference method.

For both alternative methods (i.e., the non-interference method and the uncontrolled-interference method), the area of the region containing the thickness deviations and the magnitude of the thickness deviations depend on a number of plies (i.e., part thickness) and adding plies aggravates these properties of the deviations. With more plies in the non-interference method, the area of the region containing the thickness deviations (i.e., bumps and depressions) increases, while the magnitude of the thickness deviations (i.e., the heights of bumps and depths of depressions, also called deviation severity) may be kept relatively small. With more plies in the uncontrolled-interference method, the area of the region containing the thickness deviations may be kept relatively small, while the magnitude of the thickness deviations increases. In contrast, the systems and methods described herein generate parts where both the area of the region containing the thickness deviations and the magnitude of the thickness deviations therein are independent of a number of plies. Thus, thicker parts may be produced by the systems and methods without an increase in deviation severity or area occupied by deviations, because the deviation confinement region area and deviation severity are independent of the number of plies.

FIG. 1 is a block diagram that illustrates an example of a system 100 for forming a part. The system 100 includes a computer 102, a programming device 104, and a machine 106. The system 100 is capable of designing a composite part, generating tool paths used to create the composite part, converting the tool paths into machine readable instructions, and forming the composite part based on the machine readable instructions. An example part 108 produced by the system 100 and the machine 106 is illustrated in FIG. 1. In a particular implementation, the part 108 is a composite laminate part.

The computer 102 includes a processor 112 and a memory 114. The memory 114 is configured to store modeling software 162 and part data 172. The processor 112 is configured to execute the modeling software 162, and the modeling software 162 is configured to generate the part data 172. The modeling software 162 includes or corresponds to a computer aided design (CAD) application, a computer aided engineering (CAE) application, a computer aided manufacturing (CAM) application, a product lifecycle management (PLM) application, or a combination thereof. In a particular implementation, the modeling software 162 includes a surface-based modeling program, solids-based modeling programs, or a combination thereof, such as CATIA® or SolidWorks®, registered trademarks of Dassault Systemes, or Siemens NX® (previously known as Unigraphics), a registered trademark of Siemens PLM Software. The part data 172 includes or corresponds to a three-dimensional (3D) model of a composite part, such as the part 108. In a particular implementation, the part 108 includes one or more curved surfaces (e.g., a curved surface with varying curvature) or tapered surfaces, which often contain convergence zones by virtue of their geometry. As an illustrative, non-limiting example, the part 108 is a wing spar of an aircraft. In other implementations, the part 108 includes surfaces that are flat or have parallel edges (does not include curved surfaces or taper). In such implementations, the part 108 may have one or more convergence zones for structural reasons.

The programming device 104 includes a processor 122 and a memory 124. The memory 124 is configured to store a tool path application 164, the part data 172, and commands 174 (e.g., G-code). The tool path application 164 is configured to generate the commands 174 based on the part data 172. For example, the tool path application 164 generates tool paths for a specific tool (e.g., the machine 106) based on the 3D model (generated based on the part data 172). The tool paths correspond to routes that the tool will take to place composite fiber strips or tape (tows) to form the composite part. Additionally, the tool paths include tow drop operations that correspond to a destructive interference scheme. The tool path application 164 is configured to convert the tool paths into the commands 174. The commands 174 include machine readable instructions that are executable by the tool (e.g., the machine 106). For example, the commands 174 may include instructions to apply a course of 6 tows at coordinates (X1,Y1) to coordinates (X2,Y2,) to perform a tow drop of a particular tow (cut the particular tow) at the coordinates (X2,Y2), and apply the course of 5 tows until coordinates (X3,Y3).

In some implementations, the programming device 104 receives the part data 172 from the computer 102 via a network connection. In other implementations, the programming device 104 receives the part data 172 from the computer 102 via a portable storage media. In some implementations, the programming device 104 further includes the modeling software 162, and the programming device 104 uses the modeling software 162 to generate the part data 172.

The machine 106 (e.g., an automated fiber placement machine) includes a controller 132, mechanical linkage 134, actuators 136, and a head 138. The machine 106 is configured to apply tows 144 to form the part 108. The machine 106 may include or correspond to a gantry type machine or a robotic arm (e.g., 6 axis or degree of freedom) type machine.

The mechanical linkage 134 and actuators 136 are configured to position and move the head 138 in response to control signals from the controller 132. The head 138 is configured to apply the tows 144 as courses 142 to form plies responsive to commands from the controller 132. Each course 142 includes a plurality of tows 144 (a band or course of tows). In some implementations, the head 138 includes a roller (e.g., a compaction roller) configured to apply or place the tows 144. In a particular implementation, the head 138 further includes a heater configured to heat the tows 144 before application.

The machine 106 (e.g., the head 138) includes a cutting device 140 configured to cut (e.g., by a perpendicular cut, also called a butt cut) the tows 144 of the course 142. The cutting device 140 has individual tow control. To illustrate, the cutting device 140 is configured to perform a tow drop by cutting individual tows of the course 142 at different positions along the length of the course 142. Selectively removing and adding tows to the course 142 (selective application of different numbers of tows) enables the machine 106 to adjust (narrow or widen) a width of the course 142 over the length of the course 142.

The machine 106 may form the part 108 on a mandrel (not shown). For example, the machine 106 applies the tows 144 on the mandrel. The mandrel is configured to receive the tows 144 and support the part 108. The mandrel may have an exterior shape or contour that corresponds to an exterior shape or contour of the part 108.

The controller 132 includes a processor 152 and a memory 154. The memory 154 is configured to store the commands 174. The controller 132 is configured to generate the control signals to control and activate the actuators 136 and the head 138. To illustrate, the processor 152 reads and executes the commands 174 to move the mechanical linkage 134 and the head 138 by activating or controlling the actuators 136 via control signals. Additionally, control signals are sent to the head 138 and the cutting device 140 to control tow drops and adjust the width of the course 142.

In some implementations, the machine 106 receives the commands 174 from the programming device 104 via a network connection. In other implementations, the machine 106 receives the commands 174 via a portable storage media.

Although the computer 102, the programming device 104, and the machine 106 are illustrated as separate devices in the implementation illustrated in FIG. 1, in other implementations two or more of the computer 102, the programming device 104, or the machine 106 are integrated into one device or system. For example, the computer 102 and the programming device 104 are integrated into a single device. As another example, the controller 132 of the machine 106 corresponds to a computing device that includes the modeling software 162 and the tool path application 164.

During operation of the system 100, the programming device 104 receives the part data 172 corresponding to a particular composite part, such as the part 108, to be formed by the machine 106. The tool path application 164 generates tool paths based on the part data 172 and converts the tool paths into the commands 174.

The machine 106 receives the commands 174 corresponding to the part 108 to be formed by the machine 106. The controller 132 generates control signals based on the commands 174 and sends the control signals to the actuators 136, the head 138, and the cutting device 140. The control signals activate the actuators 136 to position the head 138 and to move the head 138 along a particular tool path. The control signals activate the head 138 (e.g., the roller of the head 138) to apply multiple tows of a particular course 142.

For example, the control signals cause the machine 106 to apply first fiber tows 184 according to a pattern 109 to form a first ply 182 of a set of plies 180. The pattern 109 may include or correspond to parameters by which tows are aligned to form a particular ply or a portion of the particular ply. The parameters are described further with reference to FIG. 2. The pattern 109 may include or correspond to a starting point of a first tow or a starting point of a first deviation (due to an overlap or a gap) of the particular ply. The pattern 109 may have a corresponding pattern or arrangement of deviations, as further described herein. The control signals cause the machine 106 to apply second fiber tows 194 according to the pattern 109 to form a second ply 192 of the set of plies 180. The second ply 192 is formed over (overlies) the first ply 182. The pattern 109 of the second ply 192 is offset (shifted) relative to the pattern 109 of the first ply 182 by an offset distance based on a period of the first fiber tows 184 (e.g., the pattern 109 of the first fiber tows 184) and a number of plies having the pattern 109 in the set of plies 180.

Figure 3:
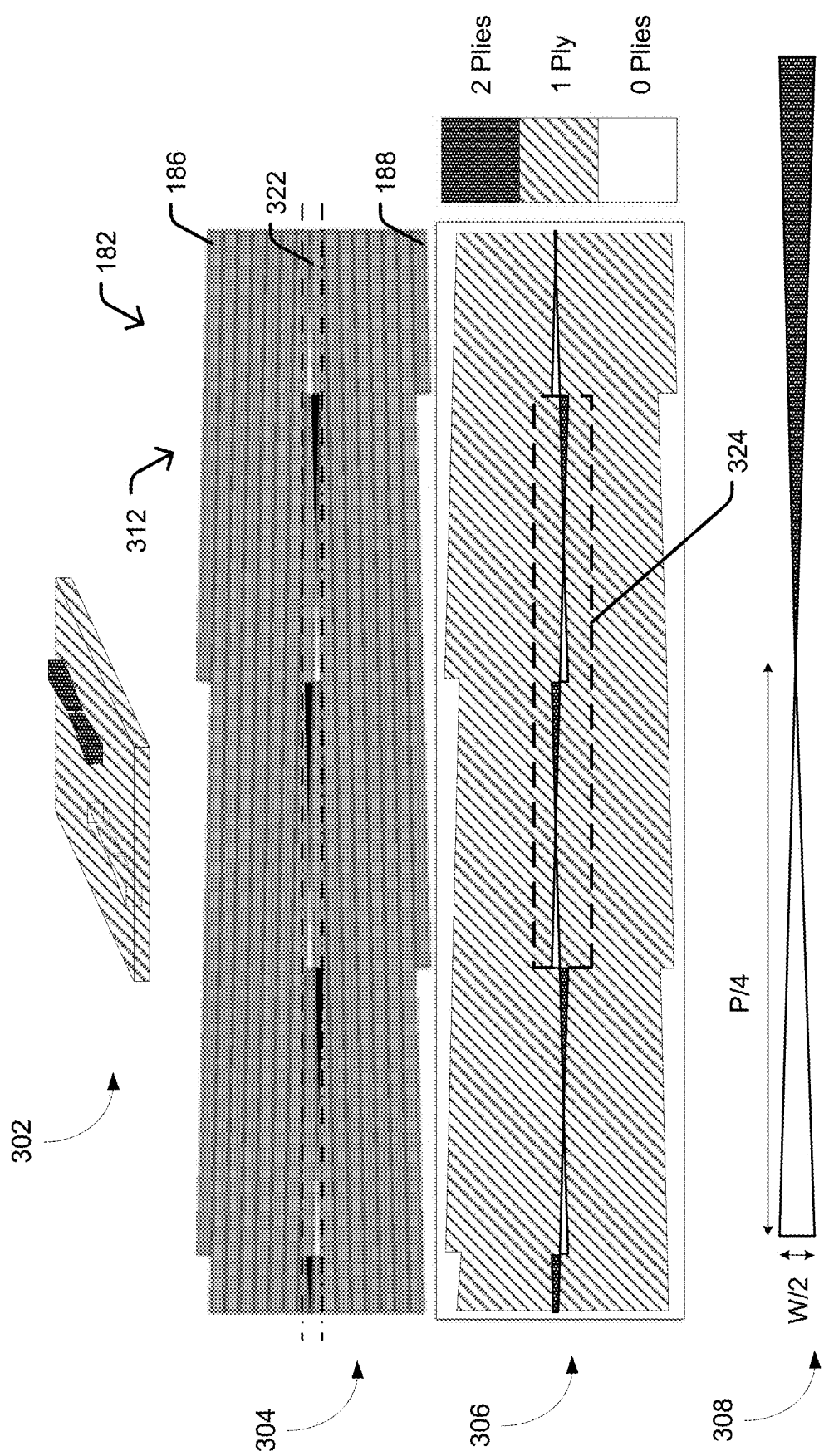
FIG. 3 illustrates diagrams related to a particular pattern of tows applied by an automated fiber placement machine.

To illustrate, the pattern 109 of the second ply 192 is shifted in a first direction (along the tool path and referred to as longitudinally offset) from the pattern 109 of the first ply 182 and superimposed on the pattern 109 of the first ply 182. The pattern 109 of the first ply 182 and the pattern 109 of the second ply 192 are aligned with respect to a second direction that is orthogonal to the first direction and laterally offset from one another. An illustrative example of the pattern 109 is shown in FIG. 3 and described further with respect to FIG. 3.

The period of the first fiber tows 184 (e.g., the pattern 109 of the first fiber tows 184) corresponds to a length (e.g., a period length) between an end of a first overlap of the first ply 182 to an end of a second overlap of the first ply 182 or an end of a first gap of the first ply 182 to an end of a second gap of the first ply 182. The period of the first fiber tows 184 (e.g., the pattern 109 of the first fiber tows 184) is illustrated and described further with respect to FIG. 2. The offset distance is calculated by dividing the period length by the number of plies having the pattern 109 in the set of plies 180. To illustrate, when the set of plies 180 includes n plies having the pattern 109, the offset distance is approximately 1/n of the period length of the first fiber tows 184. In some implementations, the number of plies having the pattern 109 in the set of plies 180 includes plies of similar orientation, such as only 0 degree plies, and excludes plies having a different orientation.

The first ply 182 includes first gaps and first overlaps, and the second ply 192 includes second gaps and second overlaps. In some implementations, the offset or shifted pattern 109 of the second ply 192 generates destructive interference between the gaps and the overlaps of the first ply 182 and the second ply 192. In some implementations, the pattern 109 is a symmetrical merge pattern about a longitudinal axis, as described further with reference to FIG. 3. In other implementations, the pattern 109 is an asymmetrical pattern, as described further with reference to FIG. 2.

The first ply 182 and the second ply 192 have the same orientation (nominal ply orientation). For example, the first ply 182 and the second ply 192 are both 0 degree plies and have fibers (e.g., tows) orientated along a length of the part 108. However, the first ply 182 and the second ply 192 include tows that are slightly offset from the nominal orientation, offset by a convergence angle.

As an illustrative example, applying the first fiber tows 184 according to the pattern 109 to form the first ply 182 includes applying a first course 186 including multiple first tows of the first fiber tows 184 and applying a second course 188 including multiple second tows of the first fiber tows 184. A particular tow of the multiple second tows overlaps a portion of a particular tow of the multiple first tows of the first fiber tows 184. The multiple first tows have a first intraply (within ply) orientation that differs from a second intraply orientation of the multiple second tows by an offset angle (e.g., convergence angle), as illustrated and described further with reference to FIG. 2.

As an illustrative example, applying the first course 186 including the multiple first tows of the first fiber tows 184 includes cutting a first particular tow of the first course 186 at a first location and cutting a second particular tow of the first course 186 at a second location. The second location is offset from the first location by a period length (e.g., a distance or length of the period) in the longitudinal direction. In other implementations, applying the first fiber tows 184 according to the pattern 109 to form the first ply 182 includes applying the multiple first tows of the first fiber tows 184 one at a time and applying the multiple second tows of the first fiber tows 184 one at a time.

In some implementations, the commands 174 further cause the machine 106 to form one or more plies of the set of plies 180 having a second orientation (nominal orientation) that is different from the orientation of the first ply and the second ply. As an illustrative example, the machine 106 may form a 0 degree ply, followed by a +45 degree ply, followed by a 90 degree ply, followed by a −45 degree ply, etc. The one or more other plies of the set of plies 180 may be formed as described herein. In some implementations, plies of multiple different orientations are interleaved between the first ply 182 and the second ply 192. In a particular implementation, plies of multiple different orientations are interleaved between the first ply 182 and the second ply 192 to achieve quasi-isotropic properties (isotropic properties in-plane). A part containing interleaved plies of different orientations has similar material properties (e.g., stiffness, strength, etc.) in all directions in a plane of the plies.

In some implementations, the commands 174 further cause the machine 106 to apply tows of one or more of the other plies according to the pattern 109. In other implementations, the commands 174 further cause the machine 106 to apply tows of a subset of plies of the other plies according to a second pattern. Additionally, instances of the second pattern of one or more of the other plies may be offset from each other, may be offset from the pattern 109 of the first ply and the second ply, or a combination thereof, based on a fiber placement protocol and/or independent of a destructive interference scheme (e.g., not based on an offset distance determined from dividing the period length by the number of plies having the pattern 109). For example, when the first ply 182 and the second ply 192 correspond to 0 degree plies, instances of patterns of plies of a different orientation (e.g., +45 degrees) may be offset from each other by a minimum protocol offset distance of a particular fiber placement protocol.

To illustrate, the commands 174 further cause the machine 106 to apply third fiber tows according to the pattern 109 to form a third ply of the set of plies, the third ply overlying the first ply and the second ply. The pattern 109 of the third ply is shifted relative to the pattern 109 of the second ply by the offset distance and is shifted relative to the pattern 109 of the first ply by twice the offset distance. In other implementations, the third ply overlies the first ply 182, and the second ply 192 overlies the first ply 182 and the third ply. Additionally, one or more plies of other types or having other patterns may be positioned between the first ply 182, the second ply 192, and the third ply. In some implementations, plies of the set of plies 180 having the pattern 109 and the orientation of the first ply 182, the second ply 192, and the third ply may be positioned between any combination of the first ply 182, the second ply 192, and the third ply. In other words, destructive interference is independent of an ordering of the plies. To illustrate, offset distances between sequential or successive plies of the same orientation (and having the pattern 109) may vary from ply to ply. Destructive interference may be caused when each ply of a subset of plies (having the pattern 109 and the same orientation) is offset from at least one other ply of the subset of plies by the offset distance.

After the machine 106 has formed the remaining plies of the set of plies 180 of the part 108, deviations of the part 108 may be remedied by post processing (shimming, filling, polishing, machining, etc.) the part 108. The post processing may be performed by another device or by hand.

The system 100 is capable of producing destructive interference of deviations without introducing (or with a marginal introduction of) constructive interference of deviations. Thus, the deviations (due to the gaps and the overlaps) of the part are confined to a relatively small region of the part having a lateral dimension of one tow width. Additionally, in particular implementations, the deviations have a magnitude of 1 ply thickness. The system 100 generates parts with less severe deviations and the deviations are contained in a smaller area, as compared to parts produced by conventional methods. Additionally, thicker parts may be produced by the system 100 without an increase in thickness deviation magnitude and without an increase in deviation confinement region, because the deviation confinement region and magnitude are independent of the number of plies. Thus, parts produced by the system 100 require less post processing. The reduction in post processing reduces the weight of the finalized part and reduces costs and time associated with producing a finalized part. Additionally, the finalized part may have increased strength and fatigue properties as compared to parts made by conventional methods.

Figure 2:
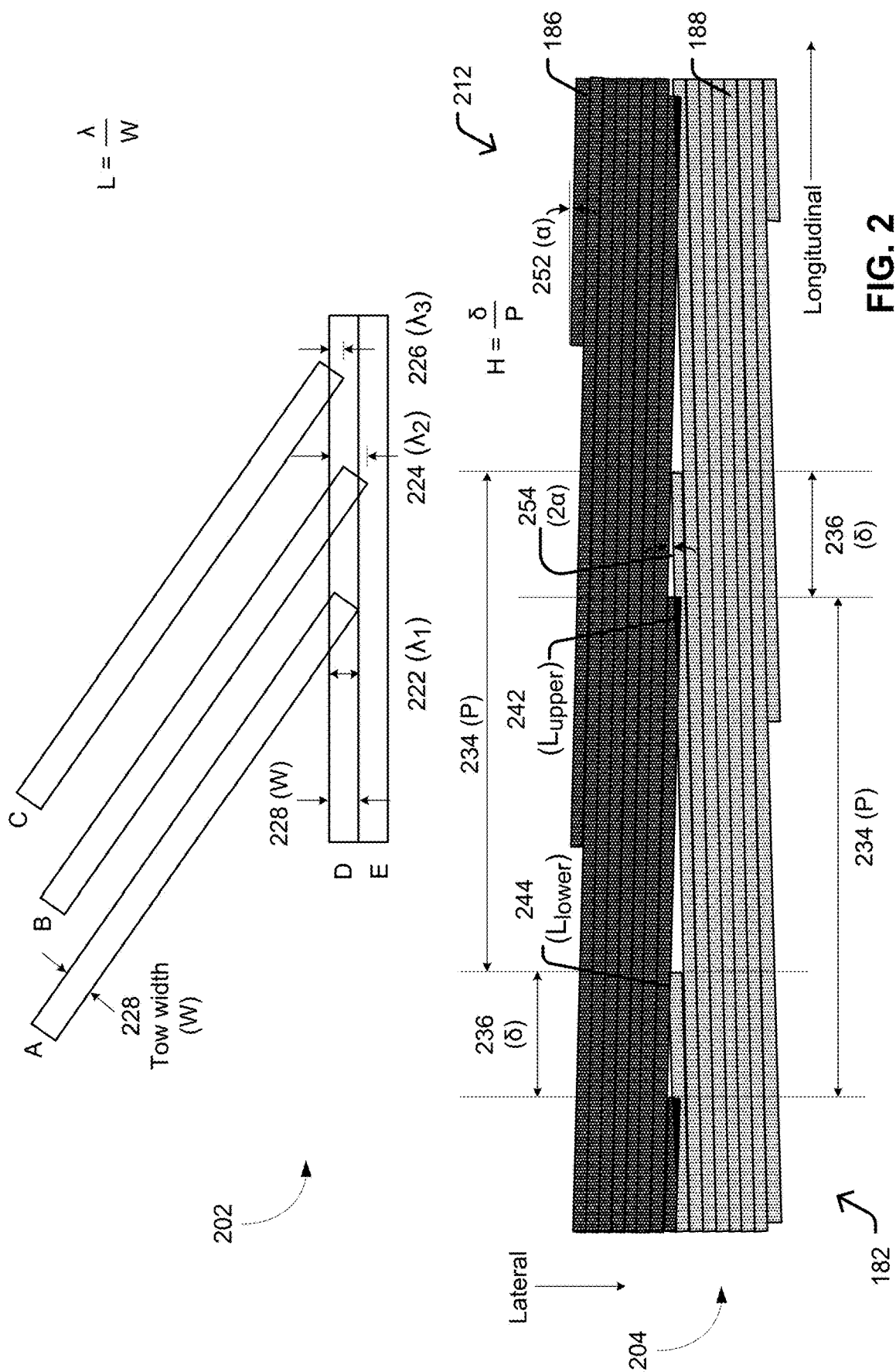
FIG. 2 illustrates diagrams of tows applied by an automated fiber placement machine.

FIG. 2 illustrates diagrams 202 and 204 of tows applied by an automated fiber placement machine, such as the machine 106 of FIG. 1. In FIG. 2, "L" denotes a convergence overlap ratio 220, "$\lambda$" denotes an absolute amount of overlap 230 (e.g., overlap in a lateral direction), and "W" denotes a tow width 228 (also referred to as tape width). The convergence overlap ratio 220 (L) is defined by the absolute amount of overlap 230 ($\lambda$) divided by the tow width 228 (W), L=$\lambda$/W. A convergence overlap ratio 220 (L) of 0.5 may contribute to generating a symmetrical pattern. A convergence overlap ratio 220 (L) of greater than 0.5 to 1 denotes a pattern (e.g., an asymmetrical pattern) that favors or generates more protrusions ("hides" more depressions inside protrusions). A convergence overlap ratio 220 (L) of 0 to less than 0.5 denotes a pattern (e.g., an asymmetrical pattern) that favors or generates more depressions ("hides" more protrusions inside depressions).

In the diagram 202, an illustrative example of tow overlap is illustrated to explain various variables and parameters of the diagram 204. The diagram 202 includes five tows, tows A-E. Tows A-C correspond to the multiple first tows (uppers tows) of the first course 186 and are offset from and overlap with tows D and E which correspond to multiple second tows (lower tows) of the second course 188. As illustrated in FIG. 2, the tows A-C are illustrated as being spaced apart from one another for clarity.

Each of the tows A-E have the tow width 228 of "W". Each tow of the first tows A-C overlaps the second tows D and E by a different amount, overlaps 222-226. Tow A has a first overlap 222 ($\lambda_1$) and overlaps tow D completely (i.e., an entire tow width 228) and does not overlap tow E, resulting in a first convergence overlap ratio $L_1$ of 1. Tow B has a second overlap 224 ($\lambda_2$) and overlaps tow D completely (i.e., an entire tow width 228) and a portion of tow E, resulting in a second convergence overlap ratio $L_2$ of 1.333. Tow C has a third overlap 226 ($\lambda_3$) and overlaps a portion (e.g., half) of tow D and does not overlap tow E, resulting in a third convergence overlap ratio $L_3$ of 0.5.

The diagram 204 illustrates a schematic view of a single ply (e.g., the first ply 182 of FIG. 1) with a longitudinal convergence zone (e.g., an internal merge seam) in the middle and oriented in a longitudinal direction. The longitudinal convergence zone is positioned (or formed between) the first course 186 and the second course 188). In the diagram 204, black portions represent tow overlap (double thickness) and white portions represent gaps (0 thickness). The diagram 204 depicts tows arranged in a pattern 212 (e.g., an asymmetrical pattern). The pattern 212 may include or correspond to the pattern 109 of FIG. 1.

In the diagram 204, "H" denotes an in-ply (intraply) longitudinal (e.g., horizontal) offset ratio, "P" denotes a period 234 of the pattern 212, and "$\delta$" denotes a distance of offset ("offset distance 236") of the pattern 212. In the diagram 204, the pattern 212 (e.g., an arrangement of the tows) is not symmetrical. The asymmetrical tow arrangement of the pattern 212 creates two convergence overlap ratios 242 and 244, "$L_{upper}$" 242 corresponding to upper deviations caused by lower tows and "$L_{lower}$" 244 corresponding to lower deviations caused by upper tows. As depicted in the diagram 204, the convergence overlap ratio $L_{lower}$ 244 of the pattern 212 of the tows is approximately 0.3 and the convergence overlap ratio $L_{upper}$ 242 of the pattern 212 of the tows is approximately 0.7. The convergence overlap ratios 242 and 244 are based on the amount of overlap ($\lambda$) at each location.

The in-ply longitudinal offset ratio 232 (H) includes a relative longitudinal offset between upper tows (of the first course 186) and lower tows (of the second course 186) and is defined by a ratio of the offset distance 236 ($\delta$) to the period 234 (P). The period 234 (P or period length) is a length that includes an upper set of deviations (due to an overlap and a gap) and a corresponding lower set of deviations. In some implementations, the period 234 length varies along a course of a part based on a contour or shape of the part. As illustrated in FIG. 2, the deviation distance 236 ($\delta$) corresponds to a length of the upper set of deviations.

In the diagram 204, "$\alpha$" denotes a convergence half angle 252 and represents an angle at which the upper tows (of the first course 186) or lower tows (of the second course 188) are oblique to from the longitudinal direction. A convergence angle 254 "$2\alpha$" represents the total angle at which the upper tows and the lower tows are oblique to from each other (e.g. an angle at which the upper tows and the lower tows meet one another). The convergence half angle 252 ($\alpha$) is generally determined based on the geometry of a part. For example, a wing spar might have a convergence half angle 252 ($\alpha$) of 1.5 degrees. As an illustrative example, when the tow width 228 (W) is 0.5 inches and the convergence half angle 252 ($\alpha$) is 1.5 degrees, the period 234 (P) is approximately 20 inches. The pattern 212 may be defined by the convergence overlap ratio 220 (L) and the convergence angle 254 ($2\alpha$).

FIG. 3 illustrates diagrams 302-308 related to a particular pattern, a symmetrical merge pattern 312, of tows applied by an automated fiber placement machine, such as the machine 106 of FIG. 1. Diagram 302 shows a 3D illustration of a portion of a single ply (e.g., the first ply 182) having the symmetrical merge pattern 312 (e.g., a basis pattern). The symmetrical merge pattern 312 may include or correspond to the pattern 109 of FIG. 1.

Diagram 304 illustrates a schematic view of the first ply 182 having the symmetrical merge pattern 312 (e.g., the basis pattern). The symmetrical merge pattern 312 has a convergence overlap ratio (L) of 0.5 and a relative longitudinal offset (H) of 0.5. These parameter values produce a symmetrical pattern of deviations (gaps and overlap), as illustrated in diagrams 306 and 308. The diagram 304 depicts a convergence zone 322 (e.g., the longitudinal zone of deviations) bounded by dotted and dashed lines.

Diagram 306 illustrates a pattern-coded map of the diagram 304. The pattern-coded map depicts a thickness of a part that includes the first ply 182 having the symmetrical merge pattern 312. The thickness of the part varies because of gaps and overlaps in the first ply 182. An overlap causes an increase in part thickness from a nominal part thickness, and a gap causes a reduction in part thickness from the nominal part thickness. In the diagram 306, the pattern-coded map depicts regions that are 2 plies thick (nominal thickness plus 1 ply thickness), 1 ply thick (the nominal thickness), and 0 plies thick (the nominal thickness minus 1 ply thickness). In the convergence zone 322, the thickness of the ply is no greater than the nominal thickness plus 1 ply thickness and no less than the nominal thickness minus 1 ply thickness. The regions that are 2 plies thick correspond to an overlap of tows of the first ply. The regions that are 1 ply thick correspond to a nominal thickness as the pattern-coded map depicts a single ply. The regions that are 0 plies thick correspond to a gap between tows of the first ply.

In the diagram 306, the gaps and overlaps occur as triangles in opposing tip-to-tip pairs that resemble a bow tie. A shape of the gaps and overlaps corresponds to right triangles and upper and lower deviations are symmetrical. A pattern of deviations 324 (e.g., a set of upper deviations and a set of lower deviations) is depicted in the dashed box in the diagram 306. In the diagram 306, the pattern of deviations (due to gaps and overlaps) is symmetrical. The symmetrical pattern of deviations includes a first overlap and gap corresponding to a particular lower tow overlapping a particular upper tow and a second overlap and gap corresponding to the particular upper tow overlapping another particular lower tow. The first overlap and gap are displaced from the second overlap and gap by a distance of one-half of the tow width in a lateral direction.

Diagram 308 illustrates a portion of the symmetrical pattern of deviations (due to gaps and overlaps). The portion of the symmetrical pattern of deviations includes a gap and an overlap. The gap and the overlap each have a height of one-half of a tow width (W) and a length of one-quarter of a period (P). As illustrated in FIG. 3, the tips of the overlaps and the gaps touch each other, in other implementations the tips of overlaps and gaps may not touch each other.

Figure 4A:
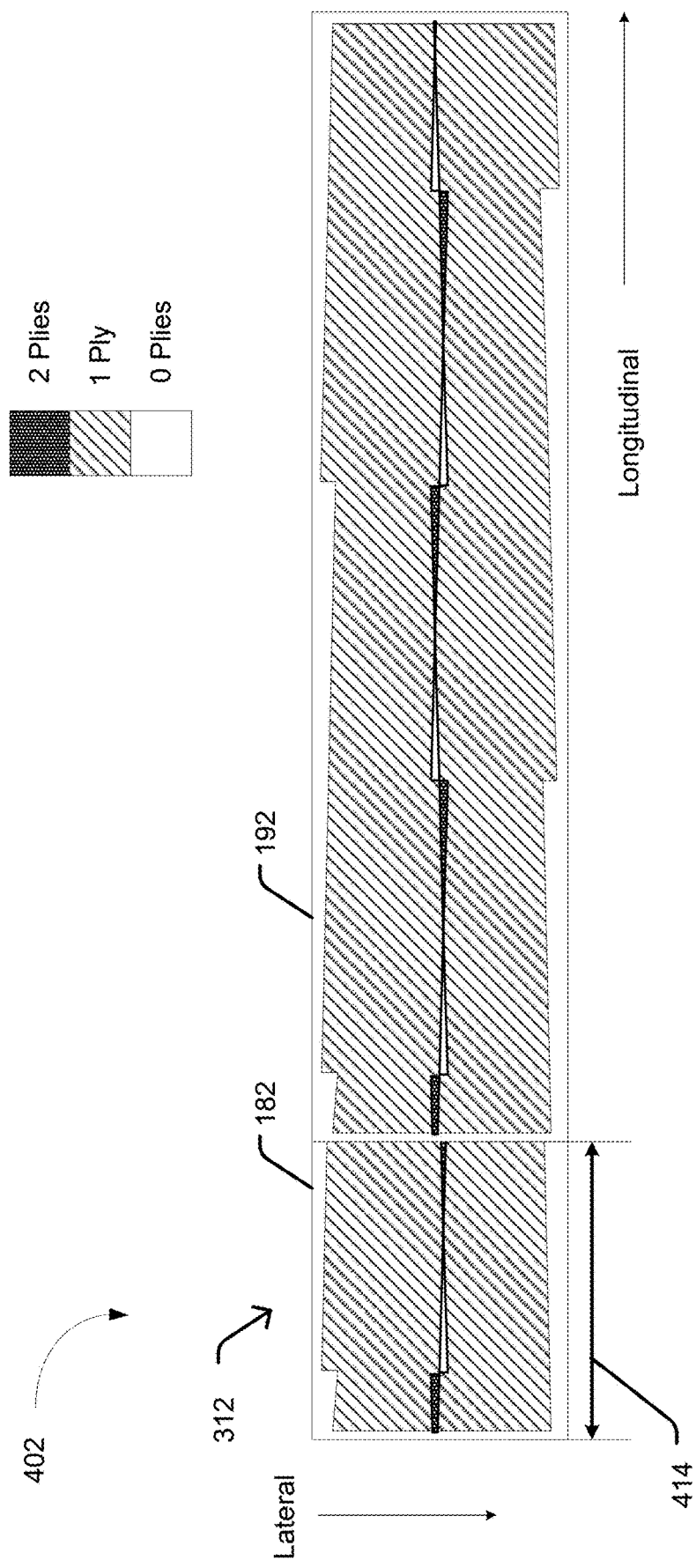
FIG. 4A illustrates a diagram depicting a pattern-coded map of a 2-ply stack.
Figure 4B:
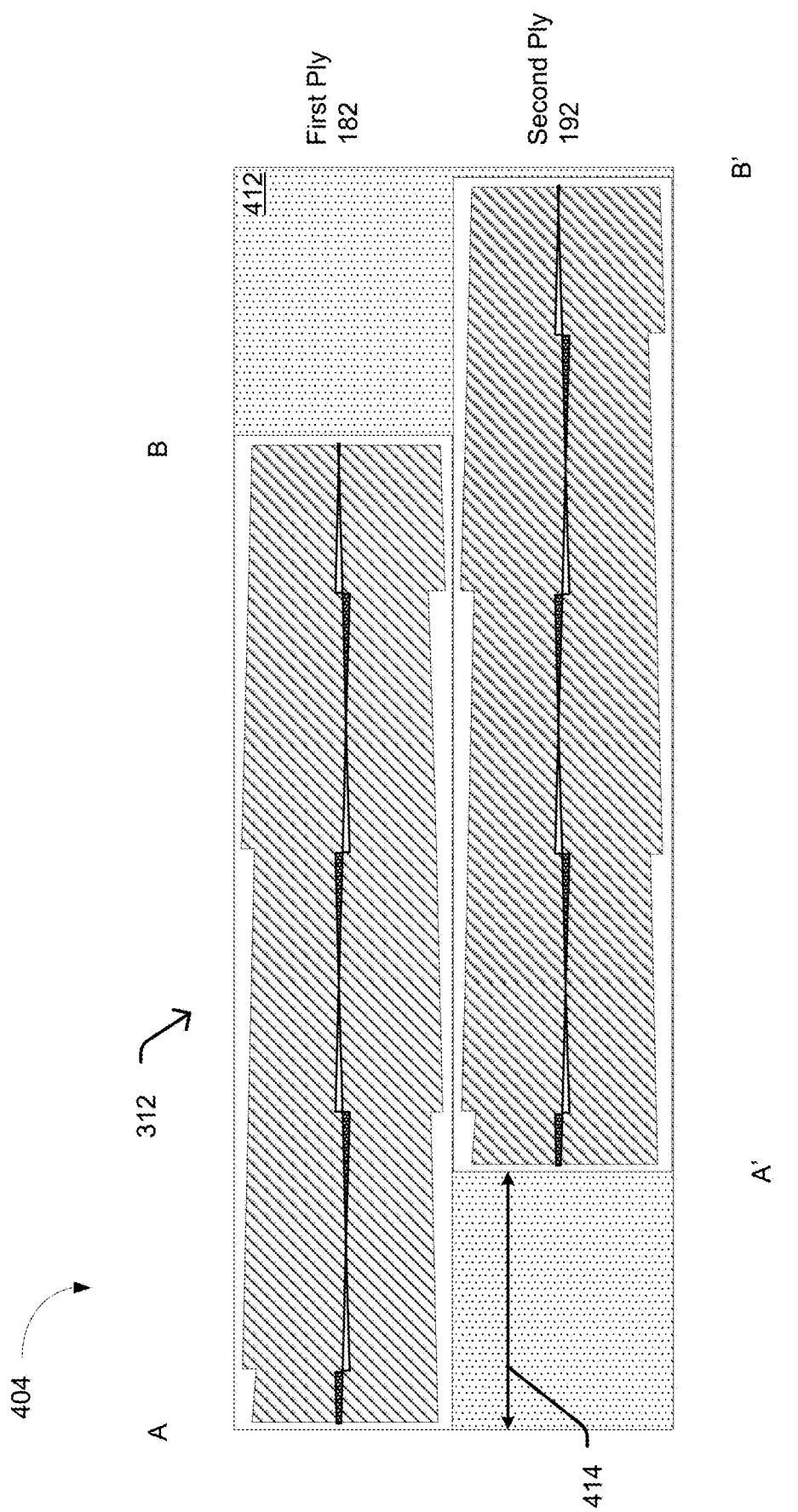
FIG. 4B illustrates a diagram depicting a pattern-coded map of the 2-ply stack of FIG. 4A.
Figure 4C:
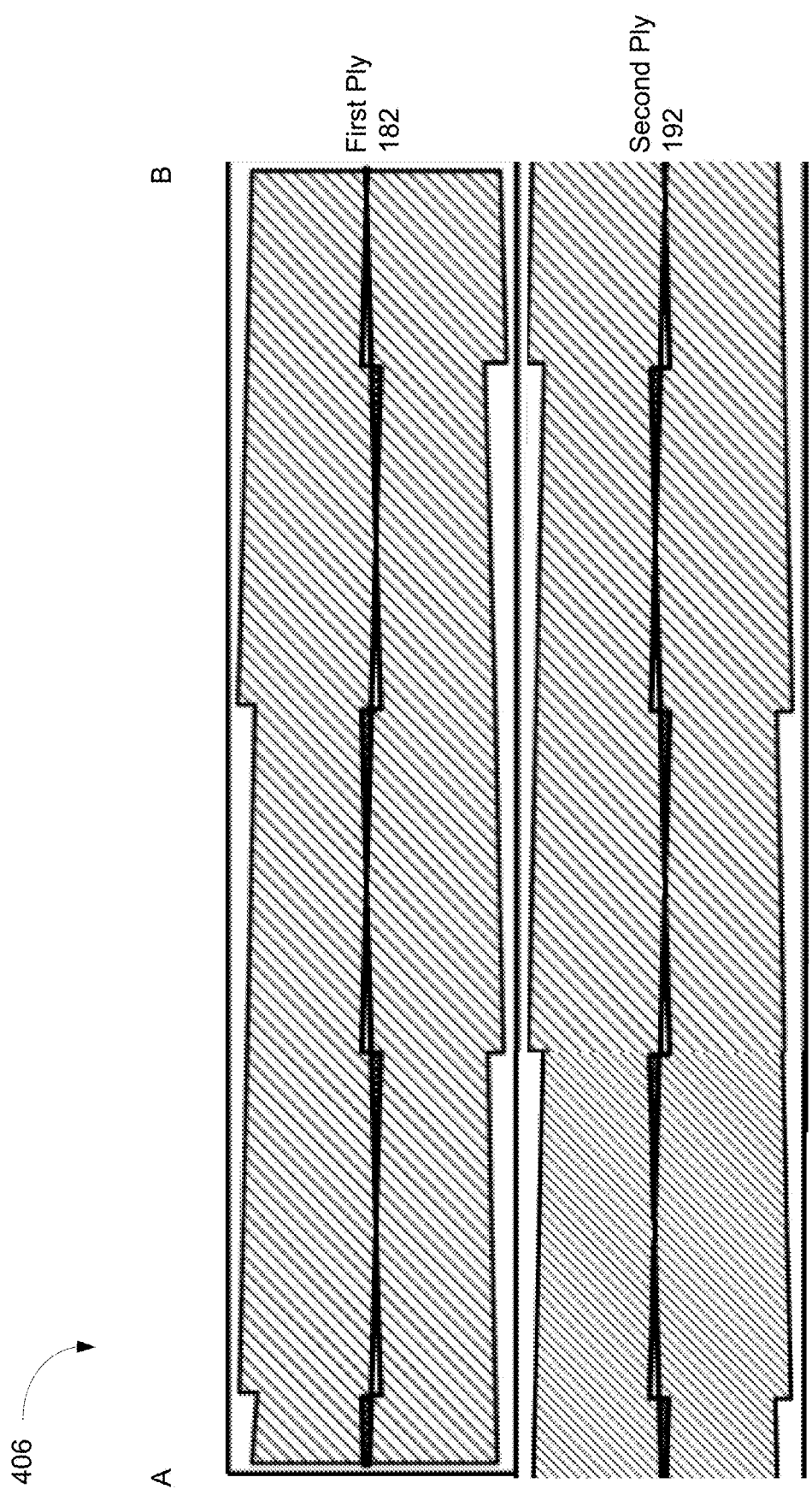
FIG. 4C illustrates a diagram depicting a pattern-coded map of the 2-ply stack of FIG. 4A.

FIG. 4A-4C illustrate diagrams 402-406 depicting pattern-coded maps of a 2-ply stack. In FIGS. 4A-4C, a set of plies (such as the set of plies 180 of FIG. 1) includes two plies (the 2-ply stack) having the same pattern, such as the symmetrical merge pattern 312 illustrated in FIG. 3. Referring to FIG. 4A, diagram 402 illustrates the plies of the 2-ply stack overlapping each other. In the diagram 402, the second ply 192 is a copy of the first ply 182 (e.g., the tows of each ply are arranged in the same pattern) and the symmetrical merge pattern 312 of the second ply 192 is shifted longitudinally from and superimposed with the symmetrical merge pattern 312 of the first ply 182. The symmetrical merge pattern 312 of the second ply 192 is longitudinally offset from the symmetrical merge pattern 312 of the first ply 182 and is laterally aligned (e.g., not shifted) with the symmetrical merge pattern 312 of the first ply 182. When two plies are stacked on top of each other, "H" refers to a ratio of a between-ply (interply) longitudinal displacement 414 "δ" (the offset distance) relative to the period (P), H=δ/P. Additionally, "L" refers to a between-ply (interply) lateral displacement "λ" relative to the tow width (W), L=λ/W. As illustrated in FIG. 4A, L is 0 and H is 0.5 (1 divided by the number (n) of plies, where n=2).

Referring to FIG. 4B, diagram 404 illustrates a representation of offset or shift between the two plies of the 2-ply stack of a section 412 of a part from A to B'. As illustrated in the diagram 404, the two plies 182 and 192 are depicted side by side to better illustrate the offset. In actuality, the two plies 182 and 192 would be stacked (with their merge-seams coinciding) on one another in a third direction (into and out of the page as illustrated in FIG. 4B) orthogonal to the longitudinal and lateral directions as shown in the diagram 402 of FIG. 4A. For clarity, regions of the section 412 of the part are omitted (lightly dotted areas) to show the offset distance and starting locations (A and A') of each ply. As illustrated in FIG. 4B, the symmetrical merge pattern 312 of each ply 182 and 192 is offset from each other by the offset distance.

Referring to FIG. 4C, diagram 406 illustrates a representation of another section of the two plies 182 and 192 from A to B of the section of the part depicted in the diagram 404 of FIG. 4B. Similar to the diagram 404 of FIG. 4B, in the diagram 406 the two plies 182 and 192 are depicted side by side to better illustrate the offset. The first ply 182 and the second ply 192 do not destructively interfere or constructively interfere with each other. To illustrate, the first ply 182 and the second ply 192 are arranged such that a first gap (upper gap) of the first ply 182 is aligned with a second gap (lower gap) of the second ply 192 and a first overlap (upper overlap) of the first ply 182 is aligned with a second overlap (lower overlap) of the second ply 192. A resulting pattern-coded map and deviation pattern for the 2-ply stack is depicted with reference to FIG. 5.

Figure 5:
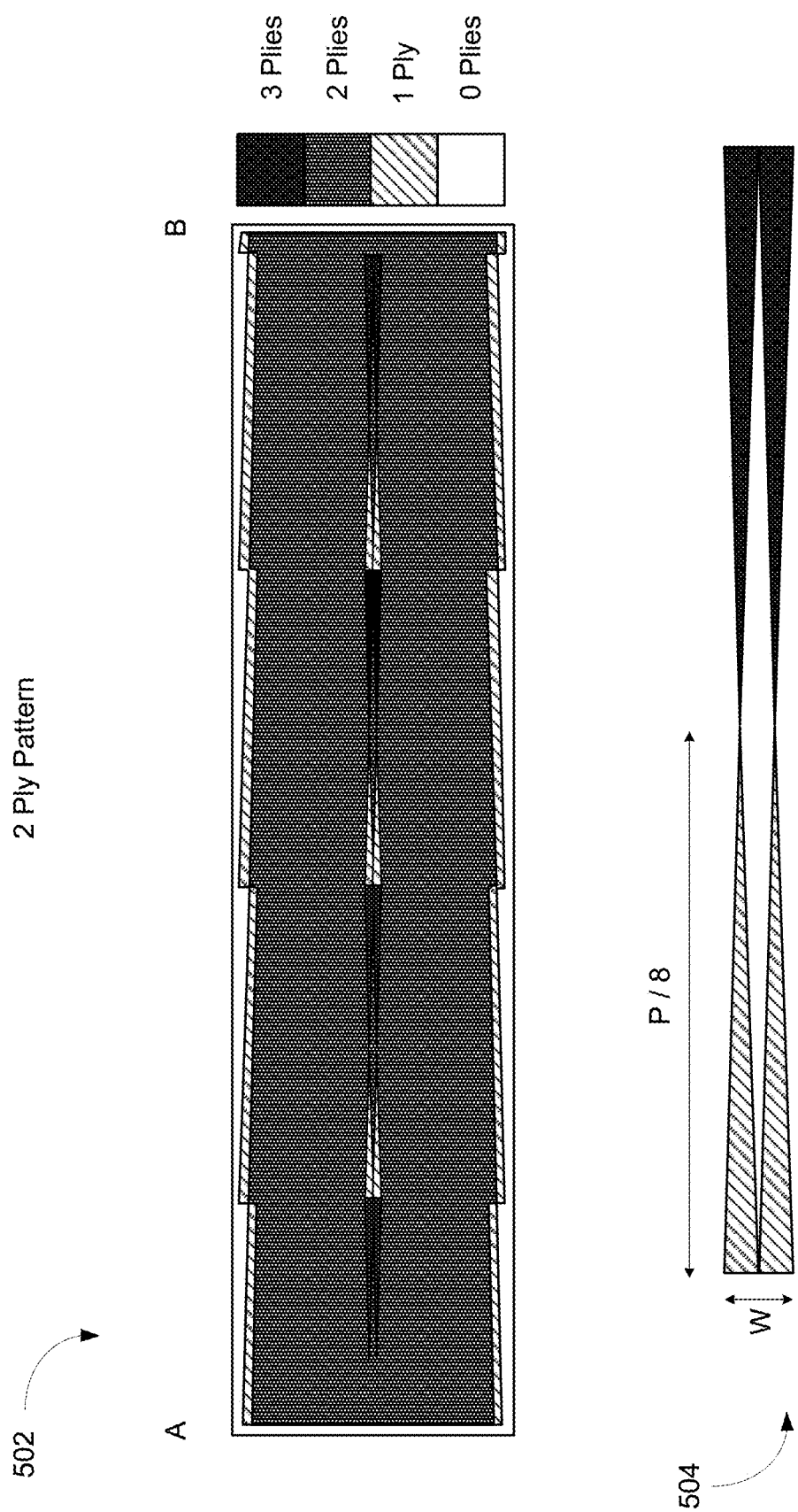
FIG. 5 illustrates diagrams corresponding to a 2-ply stack having a symmetrical merge pattern.

FIG. 5 illustrates diagrams 502 and 504 corresponding to the 2-ply stack having the symmetrical merge pattern 312 (the basis pattern) of FIGS. 4A-4C. Diagram 502 illustrates a pattern-coded map of the 2-ply stack having the symmetrical merge pattern 312 (the basis pattern). The pattern-coded map of the diagram 502 depicts a thickness of various regions of the 2-ply stack from A to B of the section of the part depicted in the diagram 406 of FIG. 4C. The pattern-coded map regions that are 3 plies thick (a nominal part thickness plus 1 ply thickness), 2 plies thick (the nominal part thickness), 1 ply thick (the nominal part thickness minus 1 ply thickness). Areas that are 0 plies thick are not included in the illustrative part but are shown for reference. In a convergence zone (e.g., the longitudinal zone of deviations), the thickness of the 2-ply stack is no greater than nominal part thickness plus 1 ply thickness and no less than nominal part thickness minus 1 ply thickness. Adding additional plies having the symmetrical merge pattern 312 to the 2-ply stack does not result in deviations from the nominal part thickness by more than 1 ply thickness in either direction (plus or minus). The regions that are 3 plies thick correspond to an overlap of tows of a particular ply. There are no regions that are 4 plies thick as the plies of the 2-ply stack do not create constructive interference (e.g., no overlap of the first ply coincides with an overlap of the second ply). The regions that are 2 plies thick correspond to a nominal thickness as the 2-ply stack includes 2 plies. The regions that are 1 ply thick correspond to a gap between tows of a particular ply. In the convergence zone, there are no regions that are included by the illustrative part that are 0 plies thick as no gap of the first ply coincides with a gap of the second ply.

Diagram 504 illustrates a portion of a symmetrical pattern of gaps and overlaps. The portion of the symmetrical pattern of gaps and overlaps includes two overlaps and two gaps. A top overlap and gap correspond to a lower tow of the first ply overlapping an upper tow of the first ply and a bottom overlap and gap correspond to an upper tow of the second ply overlapping a particular lower tow of the second ply. As illustrated in the diagram 504, the 2-ply deviation pattern includes a lateral dimension of 1 tow width (W) and deviations (due to gaps or overlaps) of the 2-ply deviation pattern have a longitudinal dimension of one-eighth of a period (P) of the pattern (the symmetrical merge pattern 312).

In the simplified example shown in FIGS. 4A-C and 5, the 2-ply stack does not generate destructive interference (a reduced thickness of the first ply 182 caused by a gap of the first ply 182 does not cancel out an increased thickness of the second ply 192 caused by an overlap of the second ply 192). Rather, the deviations are arranged such that they do not form constructive interference and the deviations are contained in a region that has a lateral dimension that is approximately the width of a single tow and the deviations have a magnitude of one tow thickness. Additionally, the deviations are contained in the region that has a lateral dimension that is approximately the width of a single tow by aligning (0 shift) the symmetrical merge pattern 312 of the second ply 192 with the symmetrical merge pattern 312 of the first ply 182 in the lateral direction.

Parts generally have more than 2 plies having the symmetrical merge pattern 312 and may have any number of plies having the symmetrical merge pattern 312. For example, 2 additional plies having the symmetrical merge pattern 312 may be formed on the 2-ply stack to produce a 4-ply stack, as shown in FIGS. 6B and 6C. The additional 2 plies have the same offset (e.g., one-half period) between each other as the 2 plies of the original 2-ply stack. Additionally, a first ply of the additional 2 plies is offset from the first ply 182 and the second ply 192 of the 2-ply stack by one-quarter period (one half of the original offset of the 2-ply stack) in the longitudinal direction, resulting in each ply of the 4-ply stack being offset from at least one other ply by one-quarter period, as described with reference to FIGS. 6A-6C. The plies of the 4-ply stack cause destructive interference, as described with reference to FIGS. 6C and 7. To illustrate, the first ply 182 causes destructive interference with each of the additional 2 plies. Additionally, a number of plies of the 4-ply stack may be doubled, such as adding 4 additional plies to the 4-ply stack with an overall offset of one-eighth of a period for the second stack, adding 8 additional plies to the resulting 8-ply stack with an overall offset of one-sixteenth of a period for the second stack, etc. Notwithstanding the preceding power of 2 examples, parts may have a non-power of 2 number of plies and the parts may have a non-power of 2 number of plies having the symmetrical merge pattern 312.

As another example, the part is designed to have a different number of plies (e.g., 5 plies) having the symmetrical merge pattern 312. In the particular implementation with 5 plies having the symmetrical merge pattern 312, an offset distance between the plies (successive plies) is one-fifth the period. In the manner of doubling described above, adding a 5-ply stack to a 5-ply stack with an offset of one-tenth of a period for the second stack results in a 10-ply stack exhibiting destructive interference. Other combinations are possible, such as three 3-ply stacks each with an internal offset of one-third of a period arranged with an offset of one-ninth of a period for the second stack and two-ninths of a period for the third stack, resulting in an overall stack of 9 plies with an internal offset of one-ninth of a period exhibiting destructive interference. In general, a stack of N plies can be decomposed into M stacks of N/M plies, if M divides N, with each smaller stack exhibiting its own destructive interference with an offset of 1/(N/M) of a period, and then formed in any order into a final stack of N plies exhibiting destructive interference with an offset of 1/N of a period.

Figure 6A:
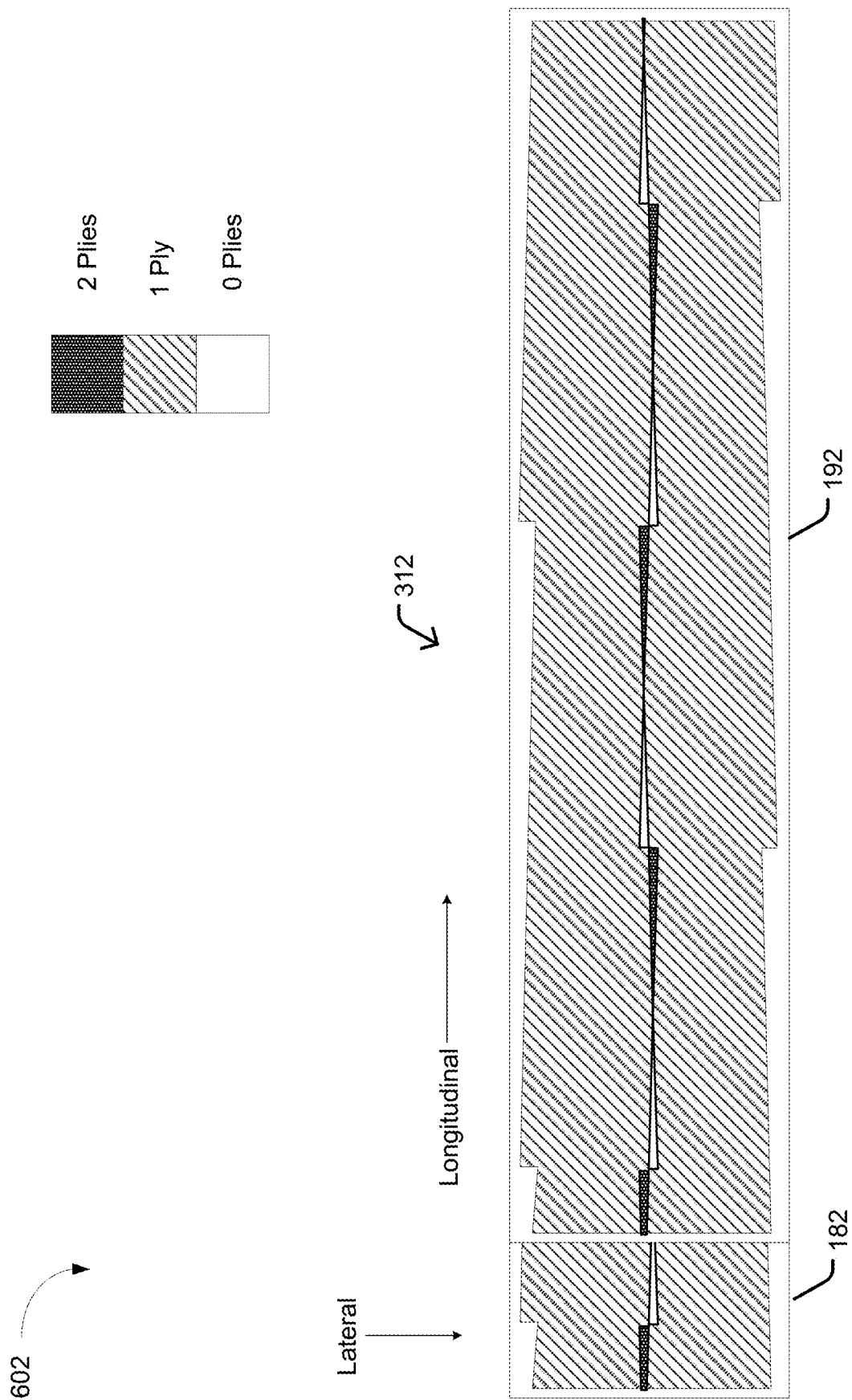
FIG. 6A illustrates a diagram depicting a pattern-coded map of plies arranged such that the plies create destructive interference of gaps and overlaps.
Figure 6B:
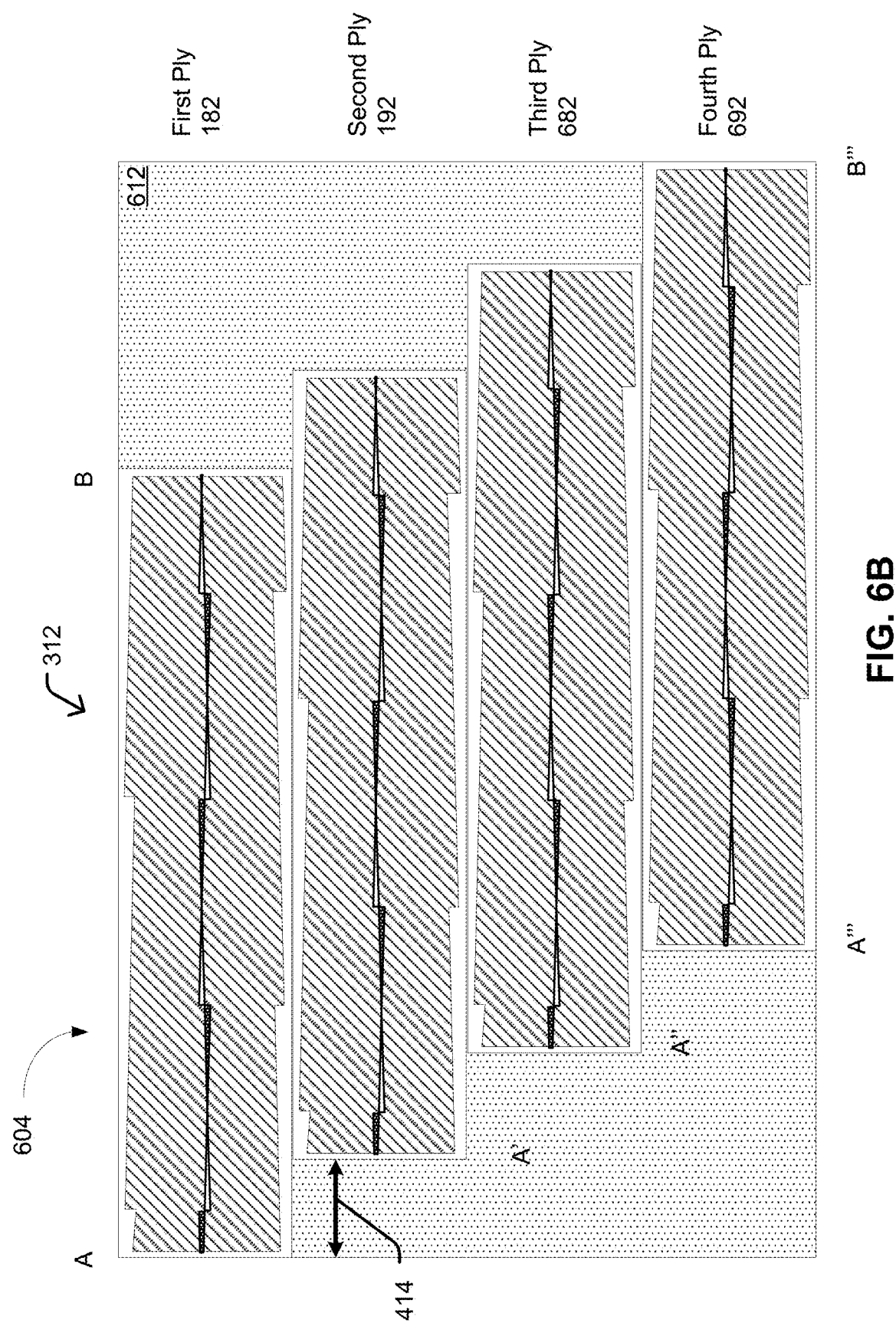
FIG. 6B illustrates a diagram depicting a pattern-coded map of a 4-ply stack.
Figure 6C:
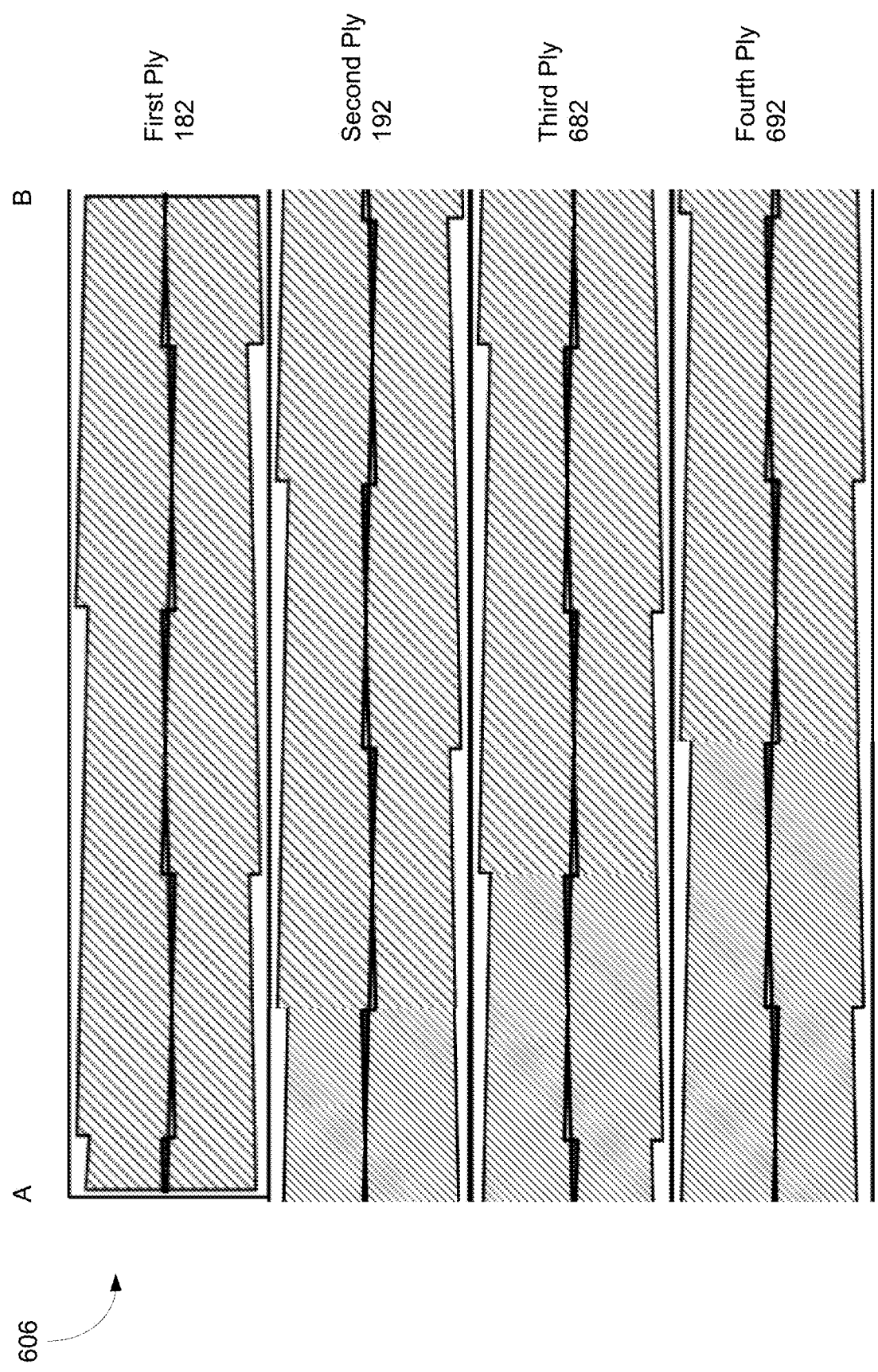
FIG. 6C illustrates a diagram depicting a pattern-coded maps of the 4-ply stack of FIG. 6B.

FIGS. 6A-6C illustrates diagrams 602-606 depicting pattern-coded maps of plies arranged such that the plies create destructive interference of gaps and overlaps. In FIGS. 6A-6C, a set of plies (e.g., the set of plies 180 of FIG. 1) includes 4 plies (a 4-ply stack) having the same pattern, such as the symmetrical merge pattern 312 illustrated in FIG. 3.

Referring to FIG. 6A, diagram 602 illustrates two overlapping plies of the 4 plies. In the diagram 602, a second ply 192 is a copy of the first ply 182 (the tows of each ply are arranged in the symmetrical merge pattern 312) and the symmetrical merge pattern 312 of the second ply 192 is shifted longitudinally from and superimposed with the symmetrical merge pattern 312 of the first ply 182. The symmetrical merge pattern 312 of the second ply 192 is longitudinally offset from the symmetrical merge pattern 312 of the first ply 182 and is laterally aligned (not shifted) with the pattern of the first ply 182. As illustrated in FIG. 6A, L is 0 and H is 0.25 (1 divided by the number (n) of plies, where n=4).

Referring to FIG. 6B, diagram 604 illustrates a representation of offset or shift between plies of the 4-ply stack for a section 612 of a part, from A to B'''. As illustrated in the diagram 604, four plies 182, 192, 682, and 692 are depicted side by side to better illustrate the offset. In actuality, the four plies 182, 192, 682, and 692 would be stacked on one another in a third direction (into and out of the page as illustrated in FIG. 6B) orthogonal to the longitudinal and lateral directions as shown in the diagram 602 of FIG. 6A. For clarity, regions of the section 612 of the part are omitted to show the offset distance and starting locations (A, A', A'', and A''') of each ply. As illustrated in FIG. 6B, the symmetrical merge pattern 312 of each ply is offset from an immediately preceding ply, an immediately succeeding ply, or both, by the same offset distance, the longitudinal displacement 414 ($\delta$).

Referring to FIG. 6C, diagram 606 illustrates a representation of another section of the 4 plies from A to B of the section of the part depicted in the diagram 604 of FIG. 6B. Similar to the diagram 604 of FIG. 6B, the diagram 606 depicts the plies of the 4-ply stack side by side to better illustrate the offset. The first ply 182 destructively interferes with the second ply 192 and a fourth ply 692, and the second ply 192 destructively interferes with the first ply 182 and a third ply 682. To illustrate, the first ply 182 and the second ply 192 are arranged such that a first gap of the first ply 182 is partially aligned with a second overlap of the second ply 192 and a first overlap of the first ply 182 is partially aligned with a second gap of the second ply 192. This alignment generates destructive interference (a portion of a depression of a gap is canceled out by a portion of a protrusion of an overlap). Additionally, in particular implementations, this alignment does not generate constructive interference. For example, a portion of a depression of first gap does not coincide with a portion of a depression of a second gap to generate a greater (deeper) depression. A resulting deviation pattern for the 4-ply stack is depicted with reference to FIG. 7.

Figure 7:
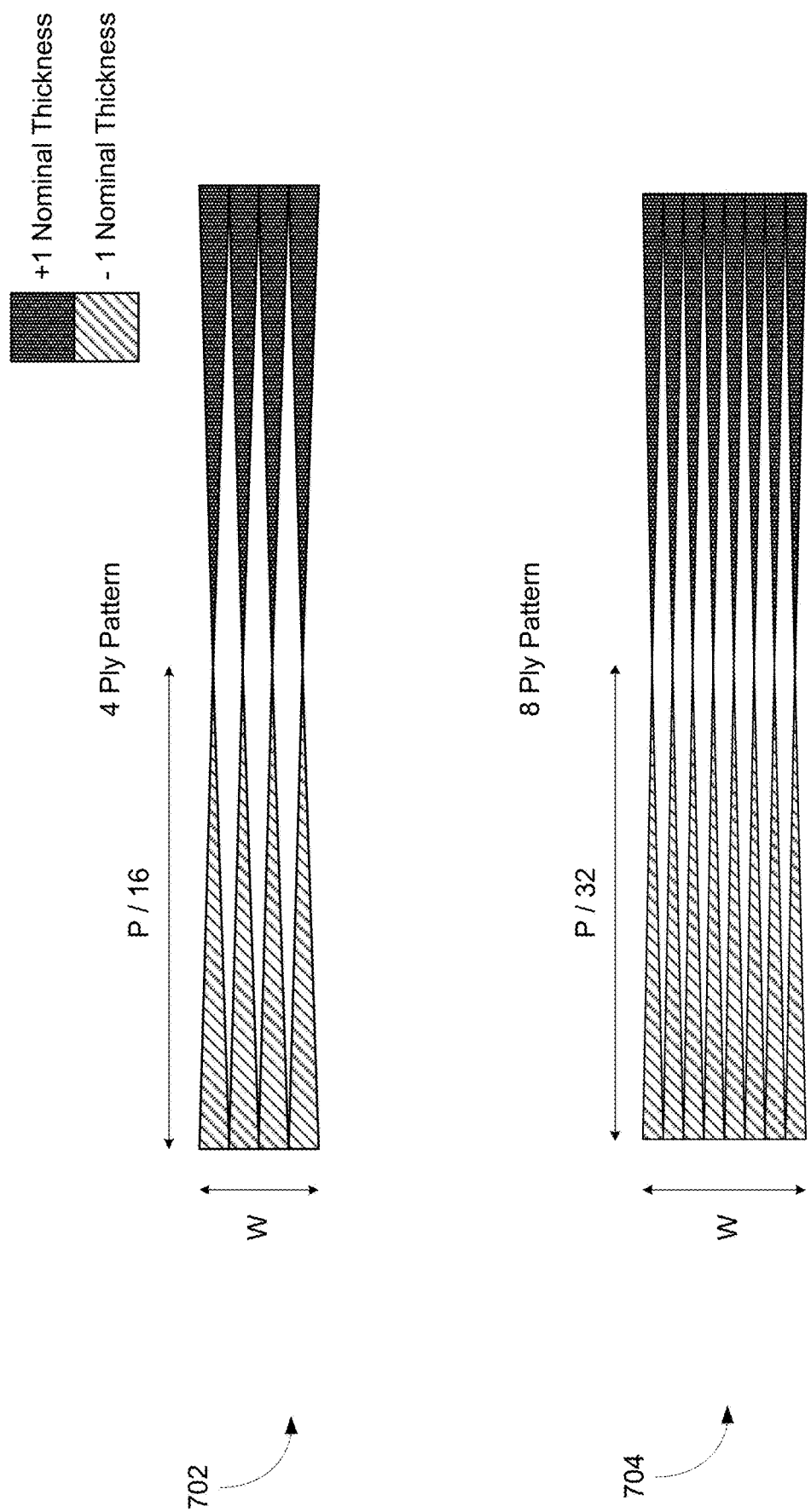
FIG. 7 illustrates diagrams of deviation patterns of sets of plies that include multiple plies having a pattern.

FIG. 7 illustrates diagrams 702 and 704 of deviation patterns of sets of plies that include multiple plies having a pattern, such as the symmetrical merge pattern 312. Diagram 702 is a deviation pattern of a 4-ply pattern having an offset of one-quarter period and diagram 704 is a diagram of an 8-ply pattern having an offset of one-eighth period. Diagram 702 correspond to a deviation pattern for the 4-ply stack illustrated in FIGS. 6A-6C. As illustrated in the diagram 702, the 4-ply deviation pattern includes a lateral dimension of one tow width (W) and deviations (due to gaps or overlaps) have a longitudinal dimension of one-sixteenth of a period of the pattern. The 4-ply deviation pattern has 4 sets of deviations in the lateral dimension of one tow width (W). The 4-ply deviation pattern has more deviations (double) and each deviation is smaller as compared to the deviations of the 2-ply stack illustrated in FIG. 5, because the plies of the 4-ply stack generate destructive interference, as described in FIG. 6C.

In the diagram 704, the 8-ply deviation pattern includes a lateral dimension of one tow width (W) and deviations (due to gaps or overlaps) have a longitudinal dimension of one-thirty-second of a period of the pattern. In FIG. 7, each deviation pattern includes overlaps of plus 1 nominal thickness and gaps of minus 1 nominal thickness. The 8-ply deviation pattern has 8 sets of deviations within the lateral dimension of 1 tow width (W). The 8-ply deviation pattern has more deviations (double) and each deviation is smaller, as compared to the deviations of the 4-ply deviation pattern illustrated in the diagram 702. The area of the region containing the deviations does not increase and the magnitude of the deviations does not increase when adding the 4 additional plies to the 4-ply stack to form an 8-ply stack because the plies of the 8-ply stack generate destructive interference and do not generate constructive interference.

By generating destructive interference (and reducing constructive interference) thicker parts may be produced without an increase in deviation magnitude and without an increase in deviation confinement region area, as shown in FIGS. 5 and 7, because the deviation magnitude and confinement region area are independent of the number of plies (the number of plies having the pattern). In contrast, both alternative methods increase the area of the region containing the deviations, increase the magnitude of the deviations, or a combination thereof, when adding additional plies having the pattern.

As explained above, the non-interference method varies the positions of the deviations (due to gaps and overlaps) from ply to ply such that the deviations are not compounded (do not form constructive interference) when additional plies are added, and the uncontrolled-interference method aligns (partially) the positions of the deviations to compound (form constructive interference) and confine the region of deviations to a relatively small area.

To accomplish the non-interference method, a pattern of tows of a first ply is offset from the pattern of tows of a second ply by a longitudinal offset ($\delta$) and a lateral offset ($\lambda$) such that gaps and overlaps of the first and the second plies are not aligned through the thickness of the composite part. While the non-interference method keeps a magnitude of the deviations low (e.g., deviations of about 1 ply thickness), the non-interference method spreads the deviation-containing region over a relatively large area as compared to an uncontrolled-interference method. In the uncontrolled-interference method, the deviations are aligned (partially) and the deviations are contained in a relatively small area; however, the uncontrolled-interference method maximizes a magnitude of the deviations. For example, the deviations are multiple plies thick and may be as thick as a number of plies that use the pattern. To accomplish the uncontrolled-interference method, the longitudinal and lateral offsets ($\delta$ and $\lambda$) of the patterns of different plies are relatively small, such that the deviations are aligned and stacked on (positioned on top of) one another and are contained in a relatively small area.

Longitudinal offset spacing ($\delta$) for the alternative methods is often based on a minimum protocol offset distance of a particular fiber placement protocol. The minimum protocol offset distance denotes a minimum offset distance between patterns of successive plies of the same orientation. For example, a particular automated fiber placement protocol includes a particular minimum protocol offset distance of 0.6 inches between plies of a particular ply orientation (e.g., a 0 degree orientation). Each ply of the particular ply orientation has a pattern at least 0.6 inches offset from the pattern of a previous ply of the particular ply orientation and from the pattern of a next ply of the particular ply orientation.

Although the diagrams illustrated in FIGS. 4-7 correspond to implementations where the number of plies having the pattern is a power of 2, in other implementations, the number of plies having the pattern is not a power of 2. As explained with reference to FIG. 1, any number of plies having the pattern may be used to form a part, including odd numbers.

Figure 8:
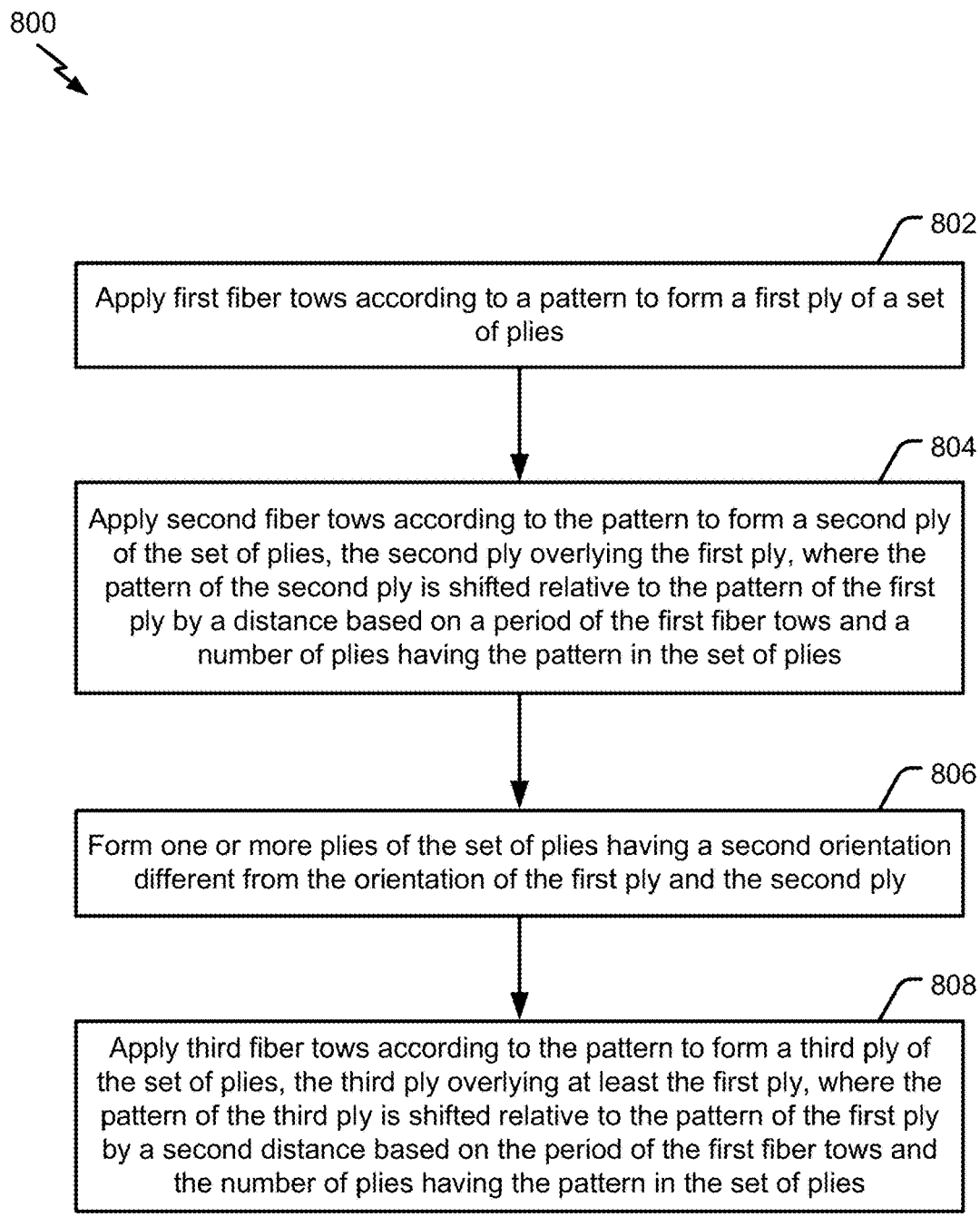
FIG. 8 illustrates a flow chart of an example of a method for forming a part.

FIG. 8 illustrates a method 800 of forming a part. The method 800 may be performed by the system 100 of FIG. 1, the machine 106, the head 138, the cutting device 140, the controller 132, or the processor 152 of FIG. 1. The method 800 may be performed in any order.

The method 800 includes, at 802, applying first fiber tows according to a pattern to form a first ply of a set of plies. The first fiber tows may include or correspond to the first fiber tows 184 of FIG. 1. The pattern may include or correspond to the pattern 109 of FIG. 1, the pattern 212 of FIG. 2, or the symmetrical merge pattern 312 of FIG. 3. The first ply may include or correspond to the first ply 182 of FIG. 1, and the set of plies may include or correspond to the set of plies 180 of FIG. 1.

The method 800 of FIG. 8 further includes, at 804, applying second fiber tows according to the pattern to form a second ply of the set of plies, the second ply overlying the first ply. The pattern of the second ply is shifted relative to the pattern of the first ply by an offset distance based on a period of the first fiber tows and a number of plies having the pattern in the set of plies. For example, the second fiber tows may include or correspond to the second fiber tows 194 of FIG. 1, and the second ply may include or correspond to the second ply 192 of FIG. 1. The offset distance may include or correspond to the longitudinal displacement 414 of FIGS. 4B and 6B, and the period may include or correspond to the period 234 (P) of FIG. 2. The number of plies having the pattern in the set of plies 180 varies from part to part and may include any number of plies "n." Additionally, the set of plies 180 may have any number of plies "m" (where m is greater than or equal to the number of plies having the pattern n). As illustrative non-limiting examples, 2 plies of a 2-ply stack have the pattern, 5 plies of a 10-ply stack have the pattern, 30 plies of a 120-ply stack have the pattern, etc.

As an example illustration, the symmetrical merge pattern 312 of the second ply 192 is shifted longitudinally from and superimposed with the symmetrical merge pattern 312 of the first ply 182, as illustrated in FIGS. 4B and 6B. In some implementations, the period corresponds to a distance between an end of a first deviation (due to overlap) of the first ply to an end of a second deviation (due to overlap) of the first ply.

The method 800 of FIG. 8 may further include, at 806, forming one or more plies of the set of plies having a second orientation different from the orientation of the first ply and the second ply. In some implementations, the set of plies includes more than 2 ply orientations, such as a 0 degree orientation, a +45 degree orientation, a 90 degree orientation, and a −45 degree orientation. The plies of different orientations may be interleaved within the part to provide quasi-isotropic material properties. For example, the part may have uniform or similar in-plane (along a plane of the plies) stiffness. In a particular implementation, 1 or more plies of the second orientation may be formed such that the 1 or more plies have tows arranged according to a second pattern (e.g., the symmetrical merge pattern or another pattern).

The method 800 of FIG. 8 may further include, at 808, applying third fiber tows according to the pattern to form a third ply of the set of plies, the third ply overlying at least the first ply. The pattern of the third ply is shifted relative to the pattern of the first ply by a second offset distance based on the period of the first fiber tows and the number of plies having the pattern in the set of plies. For example, the third ply may include or correspond to the third ply 682 or the fourth ply 692 of FIGS. 6B and 6C. In some implementations, the third ply overlies the first ply and the second ply. For example, the third ply overlies the first ply and the second ply when the offset distance and the second offset distance are greater than or equal to a minimum protocol offset distance of a particular fiber placement protocol. In a particular implementation when the third ply overlies the first ply and the second ply, the pattern of the third ply is shifted relative to the pattern of the second ply by the offset distance and is shifted relative to the pattern of the first ply by twice the offset distance.

In other implementations, the third ply is formed before the second ply and is positioned between the first ply and the second ply. For example, the third ply is formed before the second ply and is positioned between the first ply and the second ply when the offset distance or the second offset distance are less than a minimum protocol offset distance of a particular fiber placement protocol. In such implementations, offset distances (e.g., longitudinal offset distances) between the patterns of the first ply and the third ply and between the patterns of the third ply and the second ply are greater than or equal to a minimum protocol offset distance of a particular fiber placement protocol. An offset distance between successive plies of the same orientation may vary throughout the set of plies, and this is referred to as "shuffling" the plies to satisfy the minimum protocol offset distance of the particular fiber placement protocol.

In some implementations, the offset distance is calculated by dividing the period length by the number of plies having the pattern (and the same orientation as the first and second ply) in the set of plies. To illustrate, when the set of plies includes n plies having the pattern, the offset distance is approximately 1/n of the period length of the first fiber tows. An exemplary part formed having these offset distances and including n plies of the set of plies having the pattern and the same orientation as the first ply and the second ply, includes gaps causing a part thickness deviation of minus 1 ply thickness and overlaps causing a part thickness deviation of plus 1 ply thickness. Additionally, the gaps and the overlaps of the exemplary part are positioned in a region that has a lateral dimension of approximately one tow width. A magnitude or thickness of the deviations due to gaps and overlaps may be more or less than 1 ply thickness (and may cause a part thickness deviation of more or less than 1 ply thickness) based on tolerances and variations in tow thickness, width, and placement. The region which the gaps and overlaps are positioned in (e.g., confined to) may be more or less than one tow width based on tolerances and variations in tow thickness, width, and placement.

In some implementations, the first ply includes first gaps and first overlaps, the second ply includes second gaps and second overlaps, and the shifted pattern of the second ply generates destructive interference between the gaps and the overlaps of the first ply and the second ply. For example, at least a portion of a first gap of the first ply is canceled out by a first overlap of the second ply. In a particular implementation, deviations of the first ply do not create constructive interference with deviations of the second ply.

In some implementations, the pattern includes or corresponds to a symmetrical merge pattern. In a particular implementation, the symmetrical merge pattern includes a longitudinal offset of 0.5 and a ratio of tow overlap to tow width of 0.5 and includes a symmetrical pattern of gaps and overlaps. In some implementations, the gaps have a first area, the overlaps have the first area, and a shape of the first area of the gaps and overlaps corresponds to a right triangle. Additionally, the gaps have a first volume, the overlaps have the first volume, and the gaps and overlaps correspond to a right triangular prism. In a particular implementation, a first gap and a first overlap of the first ply are offset from a second gap and a second overlap of the first ply by an offset distance in the lateral direction.

In some implementations, applying the first fiber tows according to the pattern to form the first ply includes applying a first course including multiple first tows of the first fiber tows and applying a second course including multiple second tows of the first fiber tows. A particular tow of the multiple second tows overlaps a portion of a particular tow of the multiple first tows. The multiple first tows have a first intraply orientation that differs from a second intraply orientation of the multiple second tows by a convergence angle.

In a particular implementation, applying the first course including the multiple first tows of the first fiber tow includes, during application of the first course, cutting a first particular tow of the first course at a first location and cutting a second particular tow of the first course at a second location, with the second location offset from the first location by the period length in the longitudinal direction. Additionally, the first particular tow is applied at a third location after being cut at the first location during application of the first course. For example, the machine 106 may perform one or more tow drops to adjust a width of the course. In some implementations, the first ply and the second ply have the same ply orientation. For example, the first ply 182 and the second ply 192 have the same orientation relative to the part 108.

In some implementations, applying the first fiber tows according to the pattern and applying the second fiber tows according to the pattern are performed by an automated fiber placement machine. For example, the memory 154 stores processor-executable instructions that, when executed by the processor 152, cause the processor 152 to initiate application of the first fiber tows 184 according to the symmetrical merge pattern 312 to form the first ply 182 of the set of plies 180. The instructions further cause the processor 152 to initiate application of the second fiber tows 194 according to the symmetrical merge pattern 312 to form the second ply 192 of the set of plies 180 that overlies the first ply 182. The symmetrical merge pattern 312 of the second ply 192 is shifted relative to the symmetrical merge pattern 312 of the first ply 182 by an offset distance based on a period of the first fiber tows 184 and a number of plies having the pattern in the set of plies 180.

In some implementations, the instructions further cause the processor 152 to generate tool path data based on part data. The tool path data specifies a first tool path corresponding to the application of the first fiber tows and a second tool path corresponding to the application of the second fiber tows. In a particular implementation, the tool path application 164 of FIG. 1 generates the tool path data based on the part data 172.

In some implementations, the instructions further cause the processor 152 to generate commands based on tool path data. The commands include machine readable instructions for controlling an automated fiber placement device. For example, the commands include first commands corresponding to the application of the first fiber tows and include second commands corresponding to the application of the second fiber tows. The commands may include or corresponds to the commands 174 of FIG. 1. In a particular implementation, the machine 106 includes the tool path application 164 of FIG. 1 and the processor 152 generates the tool path data based on the part data 172 and generates the commands 174 based on the tool path data. In some implementations, the method 800 includes more or fewer steps than illustrated in FIG. 8.

Figure 9:
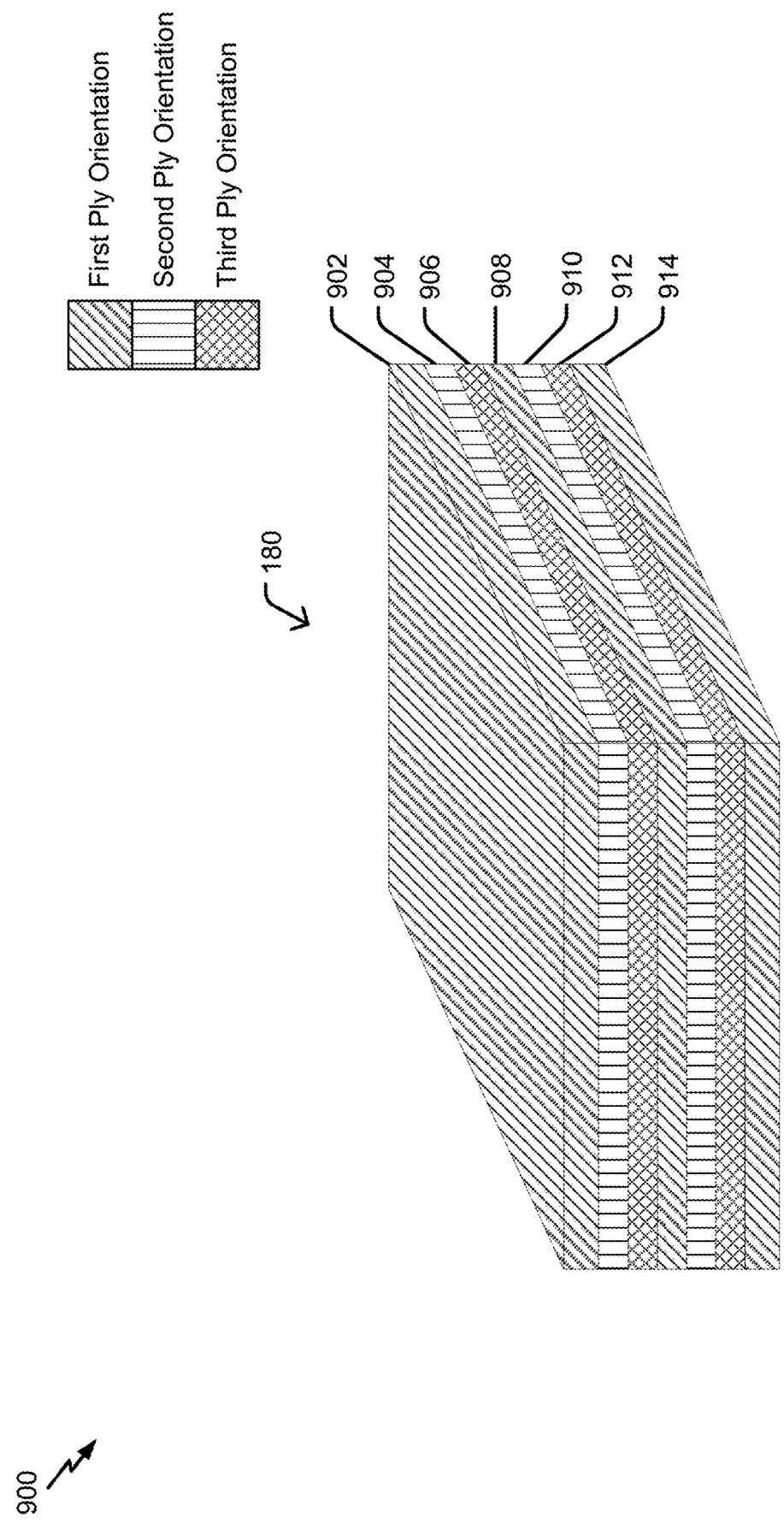
FIG. 9 illustrates a diagram that depicts an example of a cross section view of a portion of a part.

FIG. 9 is a diagram 900 that illustrates a cross section view of a portion of a part (e.g., the part 108) and depicts an order of plies of a set of plies, such as the set of plies 180. The set of plies 180 includes plies 902-914 and includes multiple ply orientations. As illustrated in FIG. 9, the set of plies 180 includes a first ply orientation, a second ply orientation, and a third ply orientation, and the orientations of the plies are alternated. Plies 902, 908, and 914 corresponds to the first ply orientation (e.g., a 0 degree ply orientation). Plies 904 and 910 correspond to the second ply orientation (e.g., a +45 degree ply orientation), and plies 906 and 912 correspond to the third ply orientation (e.g., a 90 degree ply orientation). Additional ply orientations may be included, such as a −45 degree ply orientation.

At least one particular ply orientation includes a pattern (e.g., the symmetrical merge pattern 312). Each ply of the ply orientation may include the pattern and each ply having the pattern has the pattern offset from the pattern of other plies of the ply orientation based on a period and a number of plies of the ply orientation having the pattern. For example, when each ply (plies 902, 908, and 914) of the first ply orientation includes the pattern, an offset distance for the plies 902, 908, and 914 of the first ply orientation is one-third of a period length of the pattern because there are three plies (902, 908, and 914) for the first ply orientation. Specifically, a first particular offset distance between the patterns of the plies 902 and 908 and a second particular offset distance between the patterns of the plies 908 and 914 is one-third the period length. A third particular offset distance between the patterns of the plies 902 and 914 is twice the offset distance (two-thirds the period length). An order of the three plies (902, 908, and 914) for the first ply orientation does not affect any destructive interference caused. The three plies (902, 908, and 914) for the first ply orientation may be arranged in any order (e.g., 908, 902, and 914) and still produce the same destructive interference.

In some implementations, each ply orientation may have the same pattern (e.g., the symmetrical merge pattern 312). In a particular implementation, the pattern of plies in each ply orientation is subject to an offset based on a period and a number of plies of the corresponding ply orientation. To illustrate, an offset distance for the plies 904 and 910 of the second ply orientation is one-half of a period length because there are two plies (904 and 910) for the second ply orientation. Alternatively, the patterns of different ply orientations may be offset from each other independent of an offset scheme (e.g., a destructive interference offset scheme). In other implementations, 1 or more other ply orientations have a different pattern. In these implementations, the other pattern of the 1 or more other ply orientations may be arranged based on the period and the number of plies or may be offset from each other independent of an offset scheme.

The illustrations of the examples described herein are intended to provide a general understanding of the structure of the various implementations. The illustrations are not intended to serve as a complete description of all of the elements and features of apparatuses and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of forming a part, the method comprising:
applying first fiber tows according to a pattern to form a first ply of a set of plies; and
applying second fiber tows according to the pattern to form a second ply of the set of plies, wherein the first ply and the second ply have a same orientation, the second ply overlying the first ply, wherein the pattern of the second ply is shifted relative to the pattern of the first ply by an offset distance based on a period of the first fiber tows and a number of plies having the pattern in the set of plies, and wherein the offset distance is calculated by dividing a period length of the period by the number of plies having the pattern in the set of plies.

2. The method of claim 1, further comprising forming, between the first ply and the second ply, one or more plies of the set of plies having a second orientation different from the orientation of the first ply and the second ply.

3. The method of claim 1, wherein the set of plies includes n plies having the pattern, and wherein the offset distance is approximately 1/n of a period length of the period the first fiber tows.

4. The method of claim 1, wherein the first ply includes first gaps and first overlaps, wherein the second ply includes second gaps and second overlaps, and wherein the shifted pattern of the second ply generates destructive interference between the overlaps and the gaps of the first ply and the second ply.

5. The method of claim 1, wherein the pattern of the second ply is shifted in a first direction from the pattern of the first ply and superimposed on the pattern of the first ply.

6. The method of claim 5, wherein the pattern of the first ply and the pattern of the second ply are aligned with respect to a second direction, the second direction orthogonal to the first direction.

7. The method of claim 1, wherein the pattern comprises a symmetrical merge pattern.

8. The method of claim 7, wherein the symmetrical merge pattern comprises a longitudinal offset of 0.5 and a ratio of tow overlap to tow width of 0.5.

9. The method of claim 7, wherein the symmetrical merge pattern includes a symmetrical pattern of gaps and overlaps.

10. The method of claim 1, wherein applying the first fiber tows according to the pattern to form the first ply comprises:
  applying a first course including multiple first tows of the first fiber tows; and
  applying a second course including multiple second tows of the first fiber tows, wherein a particular tow of the multiple second tows overlaps a portion of a particular tow of the multiple first tows, and wherein the multiple first tows have a first intraply orientation that differs from a second intraply orientation of the multiple second tows by a convergence angle.

11. The method of claim 10, wherein applying the first course including the multiple first tows of the first fiber tows comprises:
  cutting a first particular tow of the first course at a first location; and
  cutting a second particular tow of the first course at a second location, the second location offset from the first location by a period length of the period in a longitudinal direction.

12. The method of claim 1, further comprising applying third fiber tows according to the pattern to form a third ply of the set of plies, the third ply positioned between the first ply and the second ply, wherein the pattern of the third ply is shifted relative to the pattern of the second ply by the offset distance and is shifted relative to the pattern of the first ply by twice the offset distance.

13. A method of forming a part, the method comprising:
  applying first fiber tows according to a pattern to form a first ply of a set of plies; and
  applying second fiber tows according to the pattern to form a second ply of the set of plies, the second ply overlying the first ply, wherein the pattern of the second ply is shifted relative to the pattern of the first ply by an offset distance based on a period of the first fiber tows and a number of plies having the pattern in the set of plies, wherein the set of plies includes n plies having the pattern, and wherein the offset distance is approximately 1/n of a period length of the period the first fiber tows.

14. The method of claim 13, wherein the first ply includes first gaps and first overlaps, wherein the second ply includes second gaps and second overlaps, and wherein the pattern of the second ply generates destructive interference between the overlaps and the gaps of the first ply and the second ply.

15. The method of claim 13, wherein the pattern comprises a symmetrical merge pattern.

16. The method of claim 13, further comprising forming, between the first ply and the second ply, one or more plies of the set of plies having a second orientation different from a first orientation of the first ply and the second ply.

17. A method of forming a part, the method comprising:
  applying first fiber tows according to a pattern to form a first ply of a set of plies;
  applying second fiber tows according to the pattern to form a second ply of the set of plies, the second ply overlying the first ply, wherein the pattern of the second ply is shifted relative to the pattern of the first ply by an offset distance based on a period of the first fiber tows and a number of plies having the pattern in the set of plies; and
  applying third fiber tows according to the pattern to form a third ply of the set of plies, the third ply positioned between the first ply and the second ply, wherein the pattern of the third ply is shifted relative to the pattern of the second ply by the offset distance and is shifted relative to the pattern of the first ply by twice the offset distance.

18. The method of claim 17, wherein applying the first fiber tows according to the pattern to form the first ply comprises:
  applying a first course including multiple first tows of the first fiber tows; and
  applying a second course including multiple second tows of the first fiber tows, wherein a particular tow of the multiple second tows overlaps a portion of a particular tow of the multiple first tows, and wherein the multiple first tows have a first intraply orientation that differs from a second intraply orientation of the multiple second tows by a convergence angle.

19. The method of claim 17, wherein the period corresponds to a length between an end of a first overlap of the first ply to an end of a second overlap of the first ply.

20. The method of claim 17, wherein the first ply includes first gaps and first overlaps, wherein the second ply includes second gaps and second overlaps, and wherein the pattern of the second ply generates destructive interference between the overlaps and the gaps of the first ply and the second ply.

* * * * *